US010798441B2

(12) United States Patent
     E

(10) Patent No.: US 10,798,441 B2
(45) Date of Patent: Oct. 6, 2020

(54) INFORMATION PROCESSING METHOD, APPARATUS, AND DEVICE

(71) Applicant: TENCENT TECHNOLOGY (SHENZHEN) COMPANY LIMITED, Shenzhen (CN)

(72) Inventor: Wanyou E, Shenzhen (CN)

(73) Assignee: TENCENT TECHNOLOGY (SHENZHEN) COMPANY LIMITED, Shenzhen, Guangdong (CN)

(*) Notice: Subject to any disclaimer, the term of this patent is extended or adjusted under 35 U.S.C. 154(b) by 0 days.

(21) Appl. No.: 15/653,728

(22) Filed: Jul. 19, 2017

(65) Prior Publication Data

US 2017/0318329 A1    Nov. 2, 2017

Related U.S. Application Data

(63) Continuation of application No. PCT/CN2016/083066, filed on May 23, 2016.

(30) Foreign Application Priority Data

Aug. 25, 2015 (CN) .......................... 2015 1 0527558

(51) Int. Cl.
    *H04N 21/431*      (2011.01)
    *H04N 21/4725*     (2011.01)
    (Continued)

(52) U.S. Cl.
    CPC ..... *H04N 21/4316* (2013.01); *G06Q 30/0241* (2013.01); *H04N 21/2542* (2013.01);
    (Continued)

(58) Field of Classification Search
    CPC .......... H04N 21/4316; H04N 21/2542; H04N 21/431; H04N 21/4725; H04N 21/6587; G06Q 30/00; G06Q 30/02; G06Q 30/0241
    (Continued)

(56) References Cited

U.S. PATENT DOCUMENTS 5,559,949 A    9/1996  Reimer
5,596,705 A    1/1997  Reimer
(Continued)

FOREIGN PATENT DOCUMENTS

CN    102084388 A    6/2011
CN    103065261 A    4/2013
(Continued)

OTHER PUBLICATIONS

International Search Report in international application No. PCT/CN2016/083066, dated Aug. 19, 2016.
(Continued)

*Primary Examiner* — Nathan J Flynn
*Assistant Examiner* — Caroline Somera
(74) *Attorney, Agent, or Firm* — Brinks Gilson & Lione

(57) ABSTRACT

An information processing method includes: a second device acquires identification information of a commodity in a video; the second device acquires corresponding advertisement information according to the identification information of the commodity; and the second device contains the advertisement information in a first read response, and sends the first read response to a fourth device. An information processing apparatus and a device are also disclosed.

20 Claims, 26 Drawing Sheets

(51) Int. Cl.
*H04N 21/6587* (2011.01)
*G06Q 30/02* (2012.01)
*H04N 21/254* (2011.01)
*H04N 21/81* (2011.01)
*H04N 21/478* (2011.01)

(52) U.S. Cl.
CPC ....... *H04N 21/431* (2013.01); *H04N 21/4725* (2013.01); *H04N 21/6587* (2013.01); *H04N 21/812* (2013.01); *H04N 21/47815* (2013.01)

(58) Field of Classification Search
USPC .......................................................... 725/42
See application file for complete search history.

(56) References Cited

U.S. PATENT DOCUMENTS

| | | | | |
|---|---|---|---|---|
| 8,280,827 | B2* | 10/2012 | Muller | H04N 7/163 700/50 |
| 2002/0167484 | A1 | 11/2002 | Hatanaka | |
| 2005/0222900 | A1 | 10/2005 | Fuloria et al. | |
| 2005/0229227 | A1* | 10/2005 | Rogers | G06Q 30/02 725/115 |
| 2008/0098425 | A1 | 4/2008 | Welch | |
| 2011/0008017 | A1* | 1/2011 | Gausereide | G11B 27/034 386/280 |
| 2011/0125587 | A1 | 5/2011 | Netzer | |
| 2011/0137753 | A1* | 6/2011 | Moehrle | G06Q 30/02 705/27.1 |
| 2013/0262200 | A1* | 10/2013 | Brown | G06Q 30/0241 705/14.4 |
| 2014/0100948 | A1 | 4/2014 | Netzer et al. | |
| 2014/0100970 | A1 | 4/2014 | Netzer et al. | |
| 2014/0278997 | A1* | 9/2014 | Kishi | G06Q 30/0258 705/14.56 |
| 2015/0019350 | A1* | 1/2015 | Grant | G06Q 30/0275 705/14.71 |
| 2015/0256858 | A1 | 9/2015 | Xue | |
| 2015/0382077 | A1 | 12/2015 | Liu et al. | |
| 2017/0318355 | A1 | 11/2017 | E | |
| 2017/0318555 | A1 | 11/2017 | Livschitz | |

FOREIGN PATENT DOCUMENTS

| | | |
|---|---|---|
| CN | 103686413 A | 3/2014 |
| CN | 103888785 A | 6/2014 |
| CN | 104113786 A | 10/2014 |
| CN | 104837050 A | 8/2015 |
| EP | 2961172 A1 | 12/2015 |
| JP | H0937223 A | 2/1997 |
| JP | 2002335518 A | 11/2002 |
| JP | 2003189286 A | 7/2003 |
| JP | 2011525674 A | 9/2011 |

OTHER PUBLICATIONS

English Translation of the Written Opinion of the International Search Authority in international application No. PCT/CN2016/083066, dated Aug. 19, 2016.
Supplementary European Search Report in European application No. 16838361.0, dated Sep. 4, 2018.
English Translation of the Notification of the First Office Action of Japanese application No. 2017-548143, dated Oct. 1, 2018.
Chinese Office Action issued in Chinese Application No. 201510527588. X, dated Mar. 14, 2019 (8 pages), with English Concise Explanation (2 pages).
Korean Office Action issued in Korean Application No. 10-2017-7030271, dated Mar. 25, 2019 (7 pages).
European Examination Report dated Sep. 18, 2019 for European Application No. 16838361.0, 14 pages.

* cited by examiner

INFORMATION PROCESSING METHOD, APPARATUS, AND DEVICE

CROSS-REFERENCE TO RELATED APPLICATIONS

This is a continuation application of International Patent Application No. PCT/CN2016/083066, filed on May 23, 2016, which claims priority of Chinese Application No. 201510527558.X, filed on Aug. 25, 2015. The disclosures of these applications are hereby incorporated by reference in their entirety.

BACKGROUND

Along with vigorous development of the film and Television (TV) market, an object appearing in a film and TV video is very likely to be loved and sought after by audiences as a fashion. At present, there are two common advertising strategies in films and TV videos: one is film advertising appearing at the beginning, end and middle break of a film/teleplay, FIG. 1A is a schematic diagram of a first advertising strategy, FIG. 1A shows a pre-movie advertisement appearing at the beginning of a film "Where Are We Going, Dad?-2," and Budweiser beer 11 is displayed in the advertisement; and the other is implicit embedded advertising, FIG. 1B is a schematic diagram of a second advertising strategy, and FIG. 1B shows an automobile advertisement implicitly embedded in the film "Where Are We Going, Dad?-2". Pre-movie advertising refers to that an advertisement operating company cooperates with film maker, distributor and showing parties to play a brand advertisement of a client before each film is shown, is a most obvious and external form of film advertising, and belongs to "hard advertising". Embedded advertising refers to incorporating a commodity or service of a certain brand into a medium as a part of the medium for selling to consumers together with the medium. Embedded advertising incorporates an advertisement into a story of a film in an implicit and humanized manner to make audiences unconsciously impressed with the brand.

Film advertising has the following shortcomings: 1) for film watching users, a pre-movie advertisement is usually unassociated with the content of the film and TV, and the pre-movie advertisement abruptly appears at the beginning of the content of the film and TV, which interferes with the users and influences user experiences, and thus is likely to offend the users; 2) for an advertisement deliverer, as the pre-movie advertisement usually appears at the beginning of the content of the film and TV, a time length for which it is allowed to be displayed must be within a tolerable range of the users, that is, the time for displaying the pre-movie advertisement is limited, so that the number of advertisements which can be delivered by the deliverer is also limited; and 3) for an advertising party, delivering a pre-movie advertisement requires high costs, but on the other hand, audiences of the advertisement delivered by the advertising party are all the film watching users, and it is impossible to implement targeted delivery of the advertisement to an interested user group.

Implicit embedded advertising has the following shortcomings: 1) an amount of information which may be transferred to the users by an object appearing in a video is very limited, which forms a conflict that the object appearing in the video is very likely to attract an attention of the users but may transfer a very limited amount of information to the users; 2) an implicit embedded advertising manner may not provide a jump link or purchasing interface for the user, and thus may not directly turn the film watching users into corresponding purchasing users; and 3) implicit embedded advertising also requires very high advertising costs.

SUMMARY

In view of this, in some of the embodiments of the disclosure, an information processing method and apparatus, and device are provided, which may directly turn a video user into a consumer of a commodity, thereby increasing earnings of a video.

The disclosure relates to a video information processing technology, and in particular to an information processing method and apparatus, and device.

The technical solutions of the embodiments of the disclosure are implemented as follows.

On a first aspect, an embodiment of the disclosure provides an information processing method, applied in a second device, the method may include that: a second device acquires identification information of a commodity in a video; the second device acquires, according to the identification information of the commodity, corresponding advertisement information; and the second device contains the advertisement information in a first read response, and sends the first read response to a fourth device.

On a second aspect, an embodiment of the disclosure provides an information processing method, applied in a first device, the method may include that: a first device plays a video; the first device acquires a first input operation for selecting a commodity in a current played frame of the video; the first device acquires identification information of the commodity corresponding to the first input operation from the current frame of the video; the first device acquires a second input operation for inputting advertisement information of the commodity; the first device acquires the advertisement information of the commodity according to the second input operation; the first device sends a second advertisement access request to a second device, the second advertisement access request containing the identification information and advertisement information of the commodity; and the first device receives a second advertisement access response from the second device, wherein the second advertisement access response contains an auditing result and the auditing result indicates whether the advertisement information passes an audit.

On a third aspect, an embodiment of the disclosure provides an information processing method, applied in a fourth device, the method may include that: a fourth device plays a video; the fourth device acquires a first input operation for selecting a commodity in a current frame of the video; the fourth device acquires identification information of the commodity corresponding to the first input operation from the current played frame of the video; the fourth device acquires, according to the identification information of the commodity, corresponding advertisement information; and the fourth device displays the advertisement information on a display screen of the fourth device.

On a fourth aspect, an embodiment of the disclosure provides a second device, which may include a memory, a processor and a display screen, wherein the memory may be configured to store computer-executable instructions; the display screen may be configured to display a video including a commodity; and the processor may be configured to execute the computer-executable instructions stored in the storage medium, the computer-executable instruction including: acquiring identification information of the commodity in the video, acquiring, according to the identification information of the commodity, corresponding advertisement information, containing the advertisement information in a first read response and sending the first read response to a fourth device.

In the information processing method and apparatus and device provided by the embodiments of the disclosure, the second device acquires the identification information of the commodity in the video, acquires, according to the identification information of the commodity, the corresponding advertisement information, contains the advertisement information in the first read response, and sends the first read response to the fourth device. In such a manner, a video user may directly be turned into a consumer of the commodity, thereby increasing earnings of the video.

DETAILED DESCRIPTION

At least one embodiment of the disclosure implements an information processing method. For a commodity appearing in a video, the method may provide advertisement information for a merchant capable of providing the commodity, and besides displaying commodity information provided by the merchant (i.e. an advertisement interface where the commodity is displayed in the video), the advertisement information also provides attribute information such as introductions, selling price, purchasing link or purchasing address of the commodity. A user watching the video may just pause the video and select a commodity of interest if discovering the commodity of interest in a film watching process, the method provided by the embodiments of the disclosure may present advertisement information of the corresponding commodity in a floating layer manner, and the user may directly purchase the commodity through an advertisement floating layer or jump to a purchasing interface of the commodity for purchasing. From the above, it can be seen that the method provided by the embodiments of the disclosure provides a new video advertisement manner, and may directly turn a video user into a consumer of a commodity, and the method is applicable to various commodities, and enables merchants to display advertisements to interested audiences without high advertisement costs.

The technical solutions of the disclosure will be further described below in detail with reference to the drawings and specific embodiments.

An embodiment of the disclosure provides an information processing method, which is applied to a second device. A function implemented by the information processing method may be implemented by calling a program code through a processor in the second device. Of course, the program code may be stored in a memory. That is, the second device at least includes the processor and the memory.

Figure 1A:
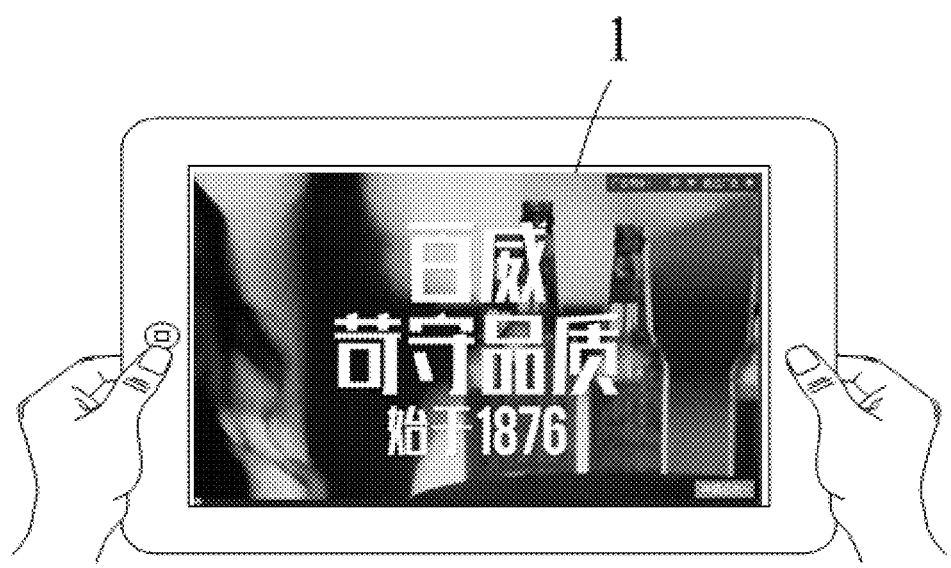
FIG. 1A is a schematic diagram of a first advertising strategy.
Figure 1B:
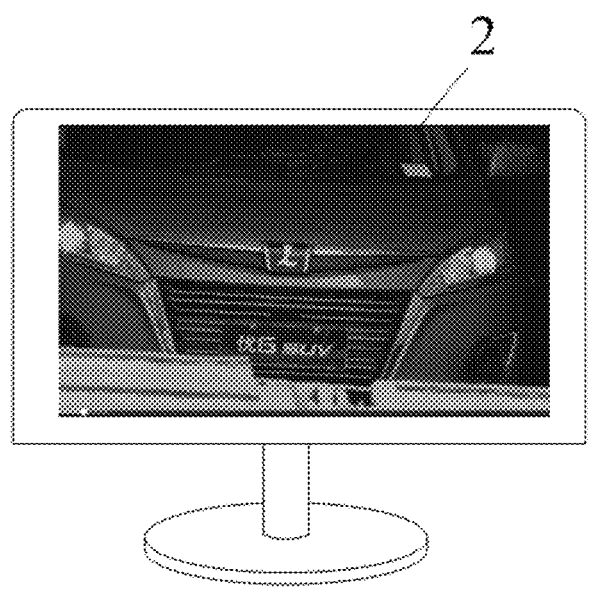
FIG. 1B is a schematic diagram of a second advertising strategy.
Figure 1C:
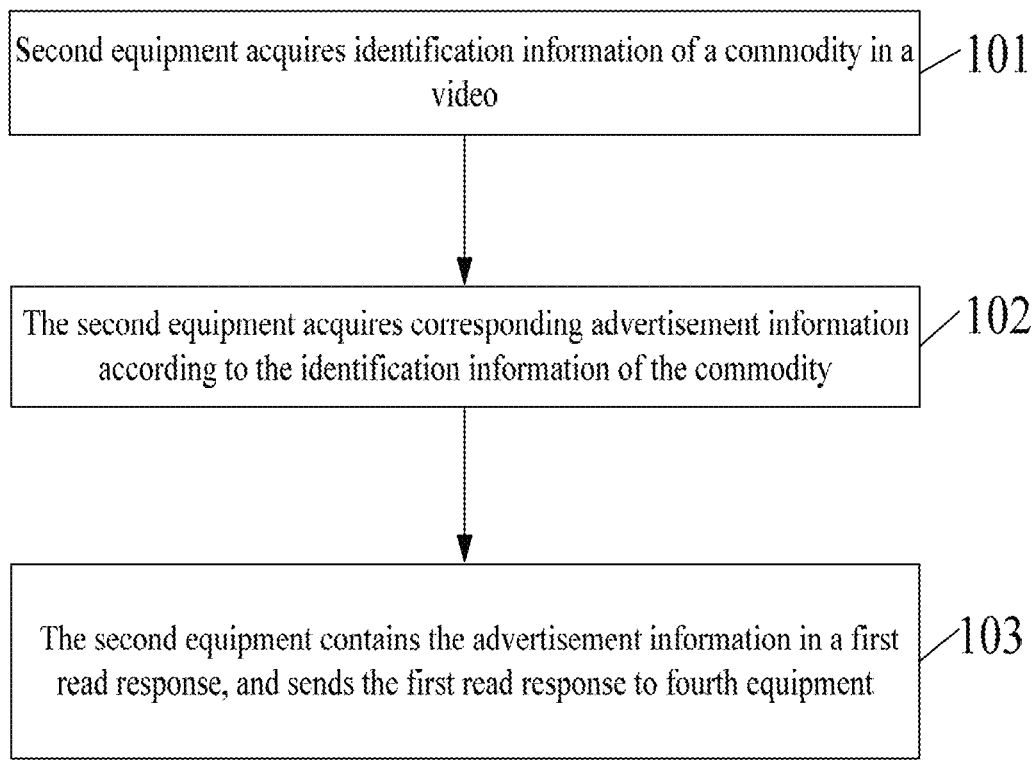
FIG. 1C is an implementation flowchart of an information processing method according to an embodiment of the disclosure.

FIG. 1C is an implementation flowchart of an information processing method according to an embodiment of the disclosure. As shown in FIG. 1C, the information processing method includes the following steps.

In Step 101, the second device acquires identification information of a commodity in a video.

Here, in a specific implementation process, the second device may be a Personal Computer (PC), an industrial control computer, a smart phone, a tablet computer, a server and the like. Herein, the PC includes a desk computer, a desktop computer, an All In One (AIO), a notebook computer and the like.

In Step 102, the second device acquires corresponding advertisement information according to the identification information of the commodity.

Here, the second device stores the advertisement information, provided by an advertisement provider (referred to as an advertiser for short), of the commodity. In the specific implementation process, advertisement information of a certain video may be stored in a database. For convenient searching, identification information of the advertisement information may also be set for the advertisement information, and the identification information of the advertisement information may be information such as a name or number of the advertisement information. The identification information of the advertisement information may be number information which uniquely identifies the advertisement information, and then the advertisement information of the video is stored in the database according to the number information of the advertisement information. In addition, a relationship list may also be set, and the relationship list is used to indicate a mapping relationship between identification information of a commodity and an identifier of advertisement information, so that identification information of the advertisement information may be found according to the identification information of the commodity, and then the corresponding advertisement information may be found from the database according to the identification information of the advertisement information. Since the advertisement information of the video is closely related to a played frame of the video, the identification information of the commodity in the frame may be stored in the relationship list in units of frames, and the advertisement information may be stored in the database in units of frames.

Here, the advertisement information may be advertisement information of the commodity, and the advertisement information of the commodity may be any information of the commodity, such as a commodity name, brand, selling price, origin, selling mall and target consumers.

Here, the advertisement information acquired by the second device according to the identification information of the commodity may be locally stored, and may also be acquired from another dedicated database server.

In Step 103, the second device contains the advertisement information in a first read response, and sends the first read response to a fourth device.

Here, in the specific implementation process, the fourth device may be an electronic device capable of watching a video, such as a PC, an industrial control computer, a smart phone, a tablet computer and a server, herein, the PC may include a desk computer, a desktop computer, an All In One (AIO), a notebook computer and the like.

Figure 1D:
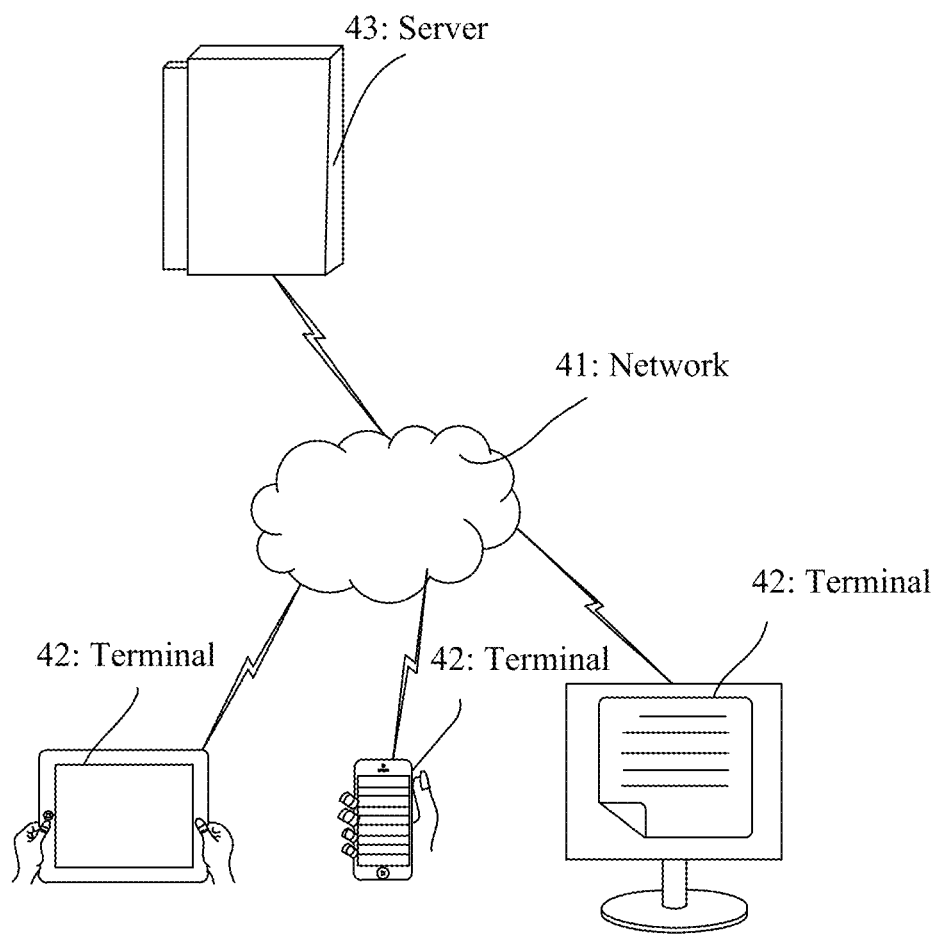
FIG. 1D is a schematic diagram of a relationship between a second device and a fourth device according to the embodiment of the disclosure.

Here, the second device and the fourth device may adopt a Client Server Model (C/S) architecture, that is, a client is installed on the fourth device (more generally speaking, the fourth device is a terminal) as an Application (APP), and the second device serves as a server which provides video services for the fourth device. FIG. 1D shows a relationship between the second device and the fourth device. As can be seen from FIG. 1D, the fourth device 42 is connected with the second device 43 through a network 41. Based on the architecture shown in FIG. 1D, a video playing process of the fourth device mainly includes that: in a process that a user watches a video through the fourth device 42, the fourth device 42 requests the second device 43 for the video through the network 41, then the second device 43 sends the video to be watched to the fourth device 42 through the network 41, and then the fourth device displays the video on a display screen of the fourth device.

In the information processing method and device provided by the embodiment of the disclosure, the second device acquires the identification information of the commodity in the video, acquires, according to the identification information of the commodity, the corresponding advertisement information, contains the advertisement information in the first read response, and sends the first read response to the fourth device. In such a manner, a video user may be directly turned into a consumer of the commodity, thereby increasing earnings of the video.

Figure 2A:
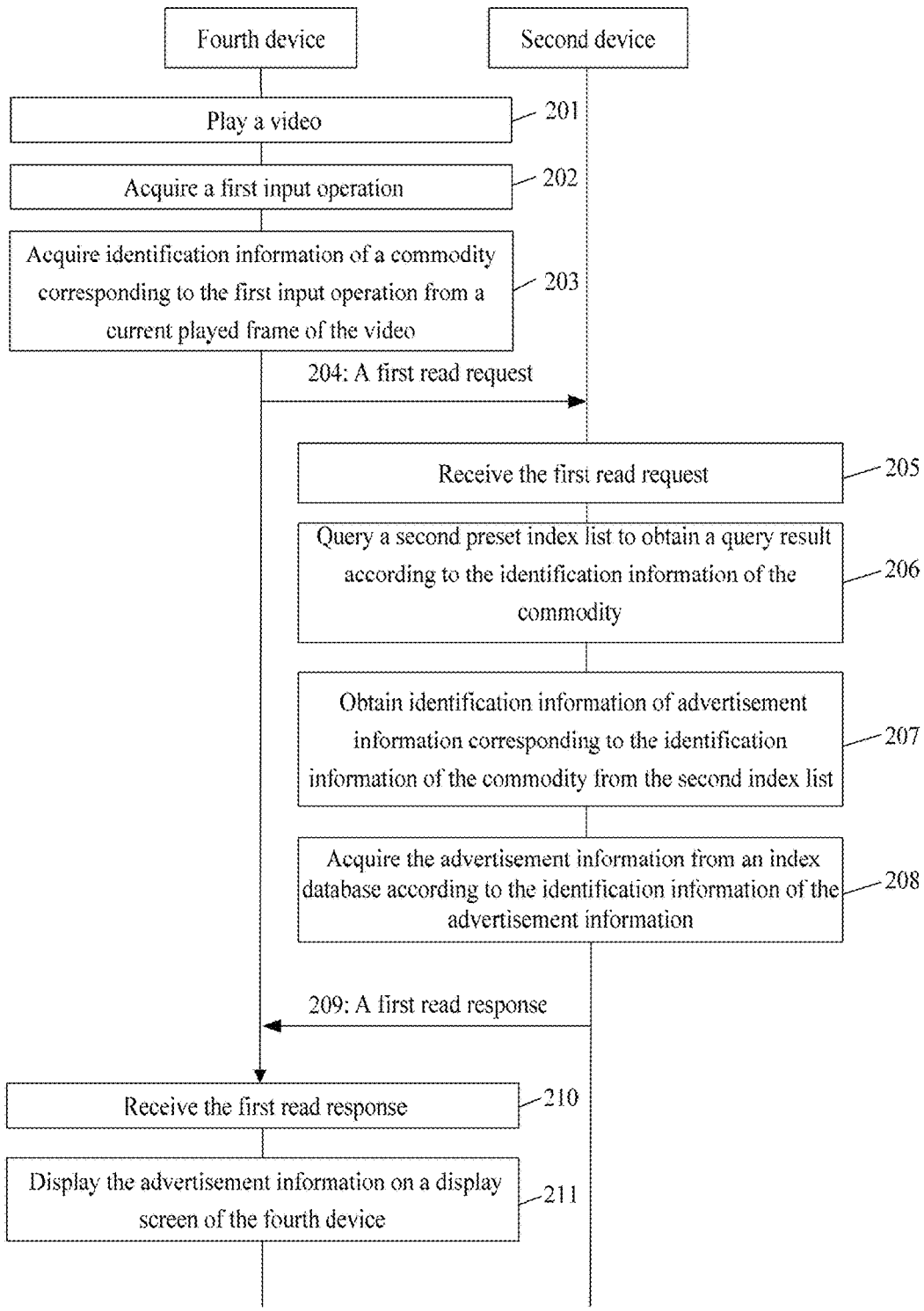
FIG. 2A is an implementation flowchart of an information processing method according to an embodiment of the disclosure.

An embodiment of the disclosure provides an information processing method. FIG. 2A is an implementation flowchart of an information processing method according to the embodiment of the disclosure. As shown in FIG. 2A, the information processing method includes the following steps.

In Step 201, a fourth device plays a video.

Here, a video playing process of the fourth device may refer to Step 103 in the embodiment described above, and thus will not be elaborated herein.

In Step 202, the fourth device acquires a first input operation for selecting a commodity in a current frame of the video.

Figure 2B:
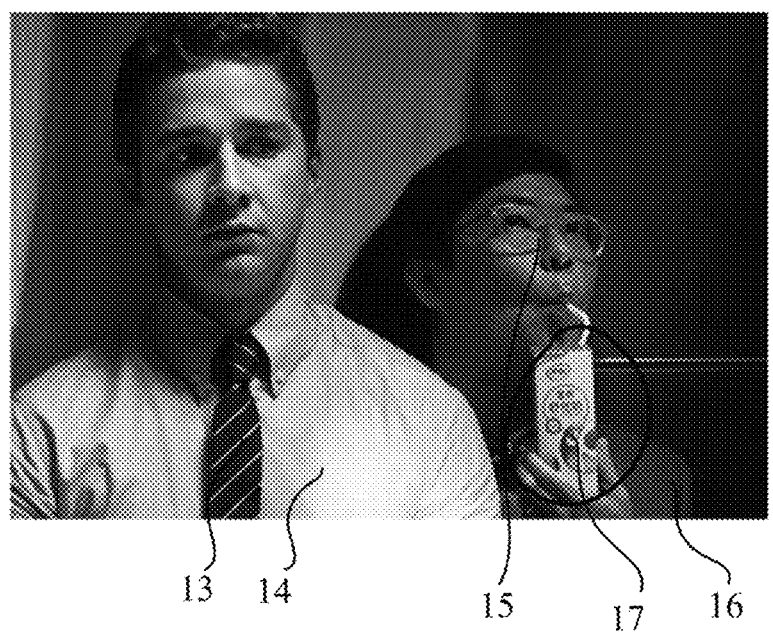
FIG. 2B is a first scenario of the embodiment of the disclosure.
Figure 2C:
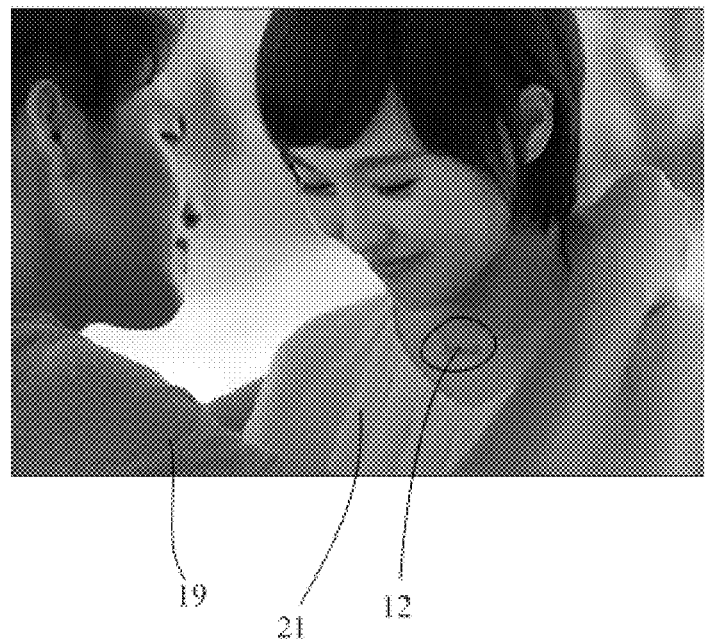
FIG. 2C is a second scenario of the embodiment of the disclosure.

Here, the commodities may be, for example, a shirt 14, necktie 13, milk 17, eyeglasses 15 and upper garment 16 shown in FIG. 2B, and a short-sleeved shirt 19, necklace 12 and chiffon shirt 21 shown in FIG. 2C.

Here, the first input operation may vary with a type of a terminal. For example, if the terminal is an ordinary PC and the input device is a mouse, the first input operation is a clicking operation on the video executed by a user through the mouse, and of course, the commodities on the video are commodities to be selected by the clicking operation executed through the mouse. When the display device of the terminal is a touch display screen (such as a smart phone, a tablet computer and a desktop computer), the first input operation may be a touch operation of an operating body, which may include a finger, a stylus and the like. It is to be noted that those skilled in the art may define a specific operation manner of the first input operation by themselves. For example, the first input operation may include an operation of the user for triggering pause of the video and another operation. For example, the first input operation may include such a series of operations that the user pauses the video, and the user moves the mouse on the video and hovers a display cursor of the mouse over a commodity in the video to select the commodity in the current played frame of the video. Of course, the first input operation may also be implemented as follows: the user touches the commodity on the current frame through a finger, or the user hovers the mouse over the commodity on the current frame. In a specific implementation process, those skilled in the art may also implement the first input operation through various well known manners, not limited to the manner provided by the embodiment of the disclosure, and thus elaborations are omitted herein.

In Step 203, the fourth device acquires identification information of the commodity corresponding to the first input operation from the current played frame of the video.

Here, the operation that the fourth device acquires the identification information of the commodity corresponding to the first input operation from the current played frame of the video in Step 203 includes:

In Step 2031, the fourth device positions the first input operation of the user to obtain position information of the first input operation.

In Step 2032, the fourth device acquires video information of the video and a frame number of the current frame.

In Step 2033, the fourth device acquires the identification information of the commodity according to the video information of the video, the frame number of the current frame and the position information of the first input operation.

Step 2031 to Step 2033 in the embodiment of the disclosure actually provide a specific implementation process of Step 203. It is to be noted that, in Step 2033 of the embodiment of the disclosure, the terminal may locally acquire the identification information of the commodity, or may request a server for the identification information of the commodity.

Figure 2D:
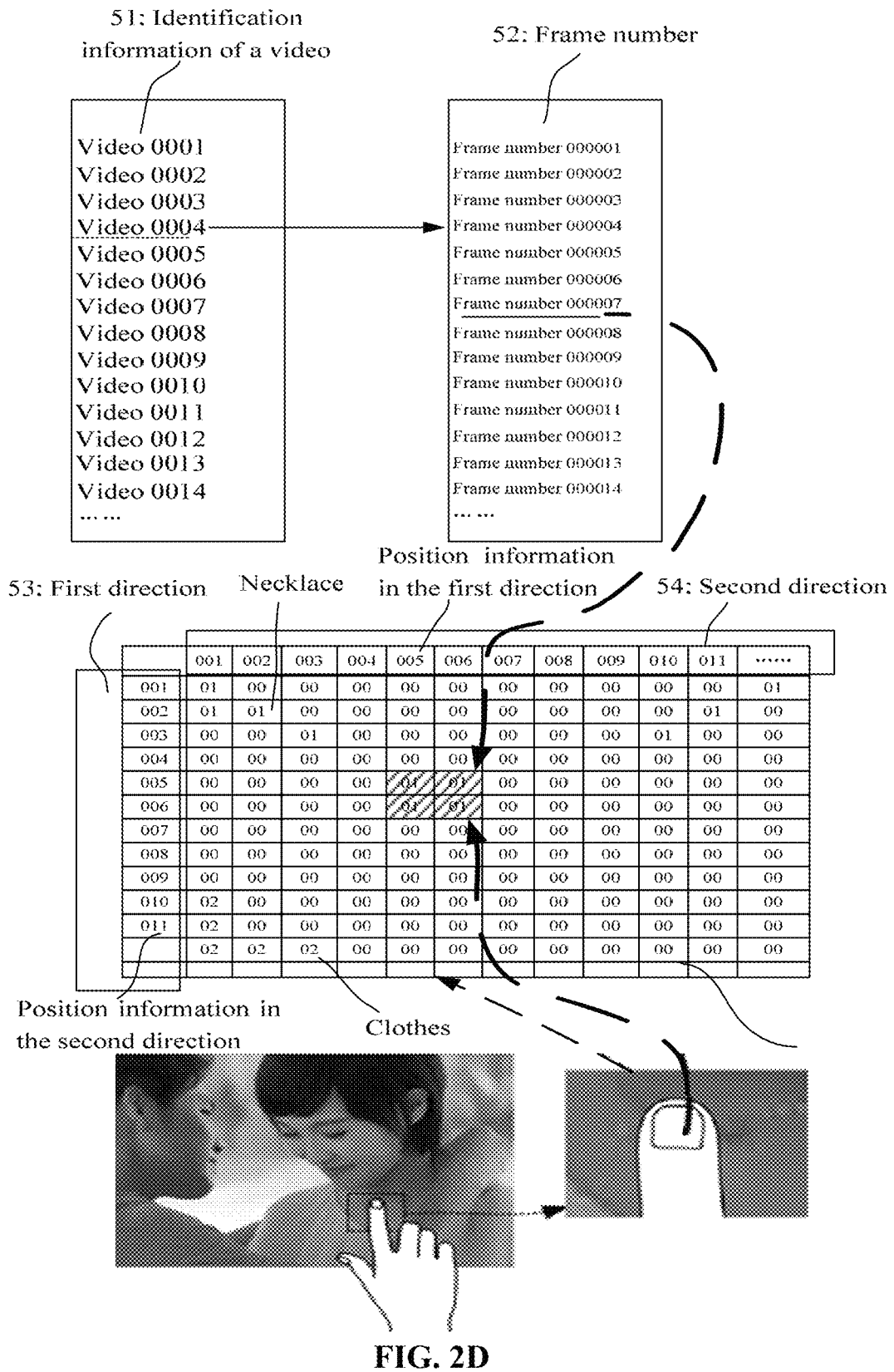
FIG. 2D is a schematic diagram of a first index list according to the embodiment of the disclosure.

When the terminal locally acquires the identification information of the commodity, the terminal needs to store a first index list; and then the terminal queries the first index list for the identification information of the commodity according to the video information, the frame number of the current frame and the position information of the first input operation. FIG. 2D is a schematic diagram of a first index list according to the embodiment of the disclosure. As shown in FIG. 2D, it is assumed that the video information includes identification information (represented by a number) and resolution (represented by pixels) of the video; it is assumed at first that the position information corresponding to the first input operation is {[05,05], [05,06], [06, 05], [06,06]}, the sequence number of the video is 004 and the frame number is 007, wherein the numbers in { } represent the position information, the first digit in [ ] represents position information in a first direction 53 and the second digit in [ ] represents position information in a second direction 54 (the position information depends on the resolution); and then a process that the terminal determines the identification information of the commodity according to the video information and the position information of the first input operation is as follows: the terminal may search the first index list for an index corresponding to the video number 004, then finds an index corresponding to the frame number 007 below the index corresponding to 004, queries a two-dimensional list according to the position information of the first input operation, a horizontal coordinate of the two-dimensional list representing the first direction 53 and a vertical coordinate of the two-dimensional list representing the second direction 54, and then queries the two-dimensional list to obtain the identification information 01 of the commodity according to the position information of the first input operation. In this way, the identification information of the commodity can be determined according to the first input operation. In the two-dimensional list, identification information 00 represents skin of an actress, the identification information 01 represents a necklace and identification information 02 represents clothes of the actress.

How the terminal locally acquires the identification information of the commodity is described above. Correspondingly, the process that the terminal locally acquires the identification information of the commodity may also be applied to the server, and then the terminal may request the server for the identification information of the commodity. The difference is that the terminal needs to send the video information of the video, the frame number of the current frame and the position information of the first input operation to the server; and the server receives the information sent by the terminal, acquires the identification information of the commodity according to the first index list shown in FIG. 2D, and then sends the identification information of the commodity to the terminal.

In Step 204, the fourth device contains the identification information of the commodity in a first read request, and sends the first read request to a second device.

Here, the first read request is used for requesting for advertisement information of the commodity corresponding to the identification information of the commodity.

In Step 205, the second device receives the first read request.

Here, the first read request contains the identification information of the commodity, that is, the second device acquires the identification information of the commodity in the video from the first read request.

In Step 206, the second device queries a second preset index list to obtain a query result according to the identification information of the commodity.

Here, the query result may indicate whether there is the advertisement information corresponding to the identification information of the commodity in an index database or not.

In Step 207, when the query result indicates that there is the advertisement information corresponding to the identification information of the commodity in the index database, the second device obtains identification information of the advertisement information corresponding to the identification information of the commodity from the second index list.

In Step 208, the second device acquires the advertisement information from the index database according to the identification information of the advertisement information.

Here, Step 206 to Step 208 actually provide a method for implementing Step 102, i.e., how "the second device acquires the advertisement information according to the corresponding identification information of the commodity".

In Step 209, the second device contains the advertisement information in a first read response, and sends the first read response to the fourth device.

In Step 210, the fourth device receives the first read response.

Here, the first read response contains the advertisement information.

Here, Step 206 to Step 210 actually provide a specific implementation process of the operation, i.e., "the fourth device acquires the advertisement information according to the corresponding identification information of the commodity".

In Step 211, the fourth device displays the advertisement information on a display screen of the fourth device.

Figure 2E:
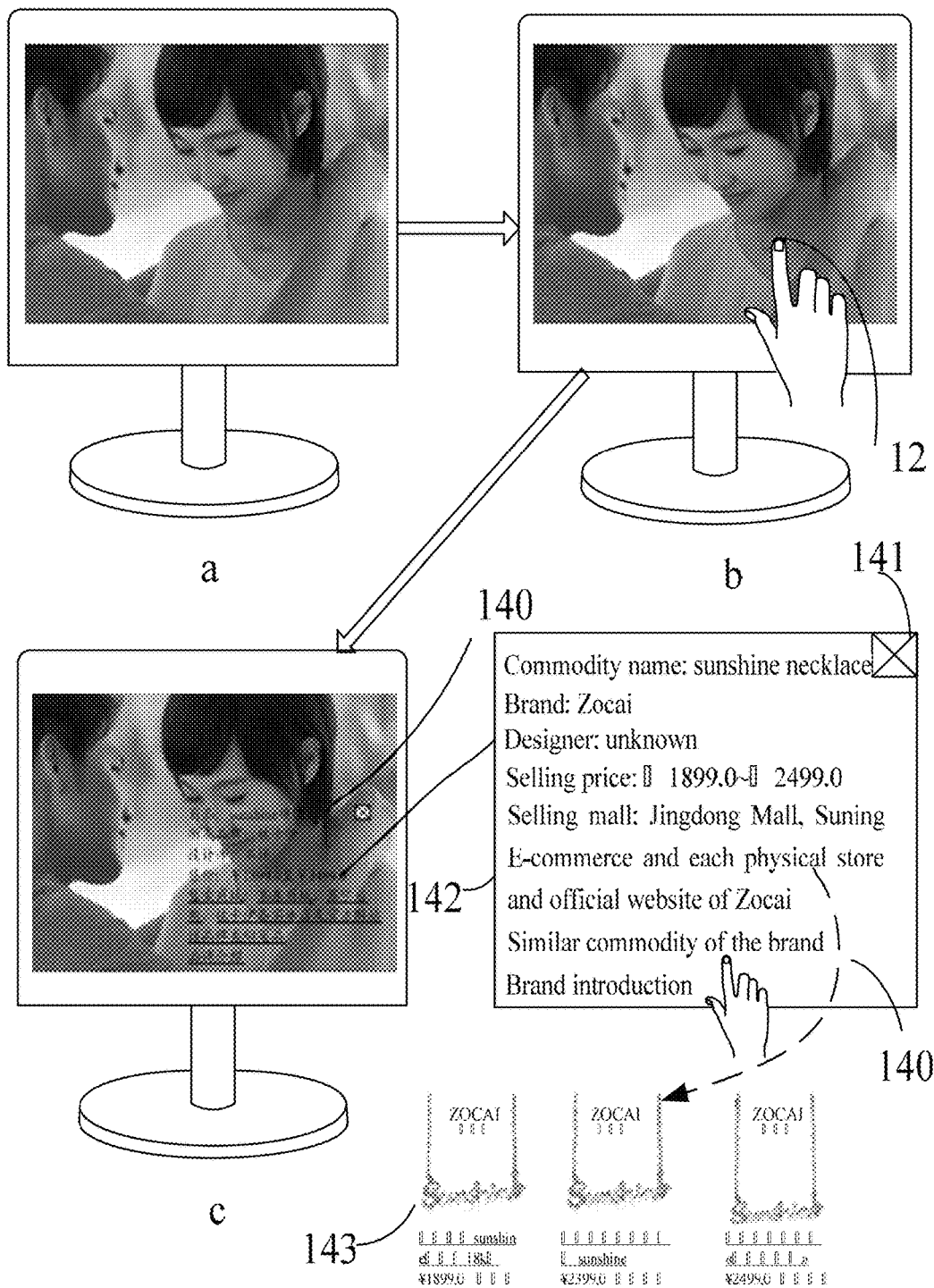
FIG. 2E is a third scenario of the embodiment of the disclosure.

The technical solution provided by the embodiment of the disclosure may be applied in the following scenario. As shown in FIG. 2E, a terminal (PC, i.e. the fourth device) is playing a video (Step 201), and a user discovers an interesting commodity during watching the video, and initiates a positioning operation (the first input operation). For example, the user watches the video on the terminal (shown in part a of FIG. 2E), and it is assumed at first that a display of the terminal is a touch display screen, so that the terminal may receive a touch operation of the user. The user discovers that the necklace 12 worn by the actress is very nice during watching the video, so that the user may hover a finger over the necklace 12 (shown in part b of FIG. 2E), that is, the user selects the necklace 12 (the necklace is a commodity) from a current frame of the video, and then the terminal receives the touch operation of the user (the first input operation, Step 202). Then, in Step 203, the terminal acquires the sequence number of the necklace 12 corresponding to the first input operation from the current played frame of the video (the sequence number is adopted as identification information of the necklace 12). Then, in Step 204, the terminal contains the sequence number of the necklace 12 in a first read request, and sends the first read request to a server (i.e. the second device). In Step 205, the server receives the first read request. In Step 206, the server queries a second preset index list to obtain a query result according to the sequence number of the necklace 12. Here, it is assumed that the server queries whether there is advertisement information corresponding to the number of the necklace 12 in an index database. In Step 207, the server obtains identification information of the advertisement information corresponding to the sequence number of the necklace 12 from the second index list. In Step 208, the server acquires the advertisement information from the index database according to the identification information of the advertisement information. In Step 209, the server contains the advertisement information in a first read response, and sends the first read response to the terminal. In Step 210, the terminal receives the first read response. The terminal acquires the advertisement information of the necklace 12 from the first read response. The terminal displays the advertisement information of the necklace 12 in a floating layer manner. As shown in part c of FIG. 2E, the advertisement information of the necklace 12 is displayed to the user through a floating layer 140, the advertisement information of the necklace 12 includes: commodity name: sunshine necklace, brand: Zocai, designer: unknown, selling price: ¥1899.0 to ¥2499.0, selling mall: Jingdong Mall, Suning E-commerce and each physical store and official website of Zocai, similar commodities of the same brand and brand introduction. The floating layer 140 includes a close button 141, and when the user triggers the close button 141, the floating layer 140 may be closed. Content displayed in the floating layer 140 may further include a link. For example, the selling mall 142 of the necklace 12 may be opened in a link manner, and then content 143 linked with the selling mall 142 is displayed when the finger of the user touches the selling mall 142.

In a specific implementation process, the floating layer 140 has a certain display time limit, and for example, is displayed for 30 seconds, and then the terminal automatically closes the floating layer 140. Of course, the terminal may automatically close the floating layer of the current frame when a next frame is played, or may display the floating layer according to a duration of the first input operation. For example, when the finger of the user is kept at the necklace 12, the floating layer 140 is displayed all the time, and when the finger of the user is moved away from the necklace 12, the floating layer naturally disappears.

As can be seen from the above embodiment, a system may provide advertisement access for a corresponding merchant for the commodity appearing in the video, the advertisement information may include information such as introduction, selling price, purchasing link or purchasing address of the commodity, and the advertisement system establishes an advertisement interface for the merchant. The user watching the video just needs to pause the video to select the interesting commodity if discovering the interesting commodity in the video watching process, the system may display the advertisement interface of the corresponding commodity in the floating layer manner, and thus the user may directly purchase the commodity or jump to a purchasing interface of the commodity for purchasing through the advertisement floating layer. Thus, the embodiment of the disclosure provides a novel video advertisement manner, which may directly turn the video user into a consumer of the commodity, and the method is applicable to various commodities, and enables merchants to display advertisements to interested audiences without high advertisement costs.

Figure 3:
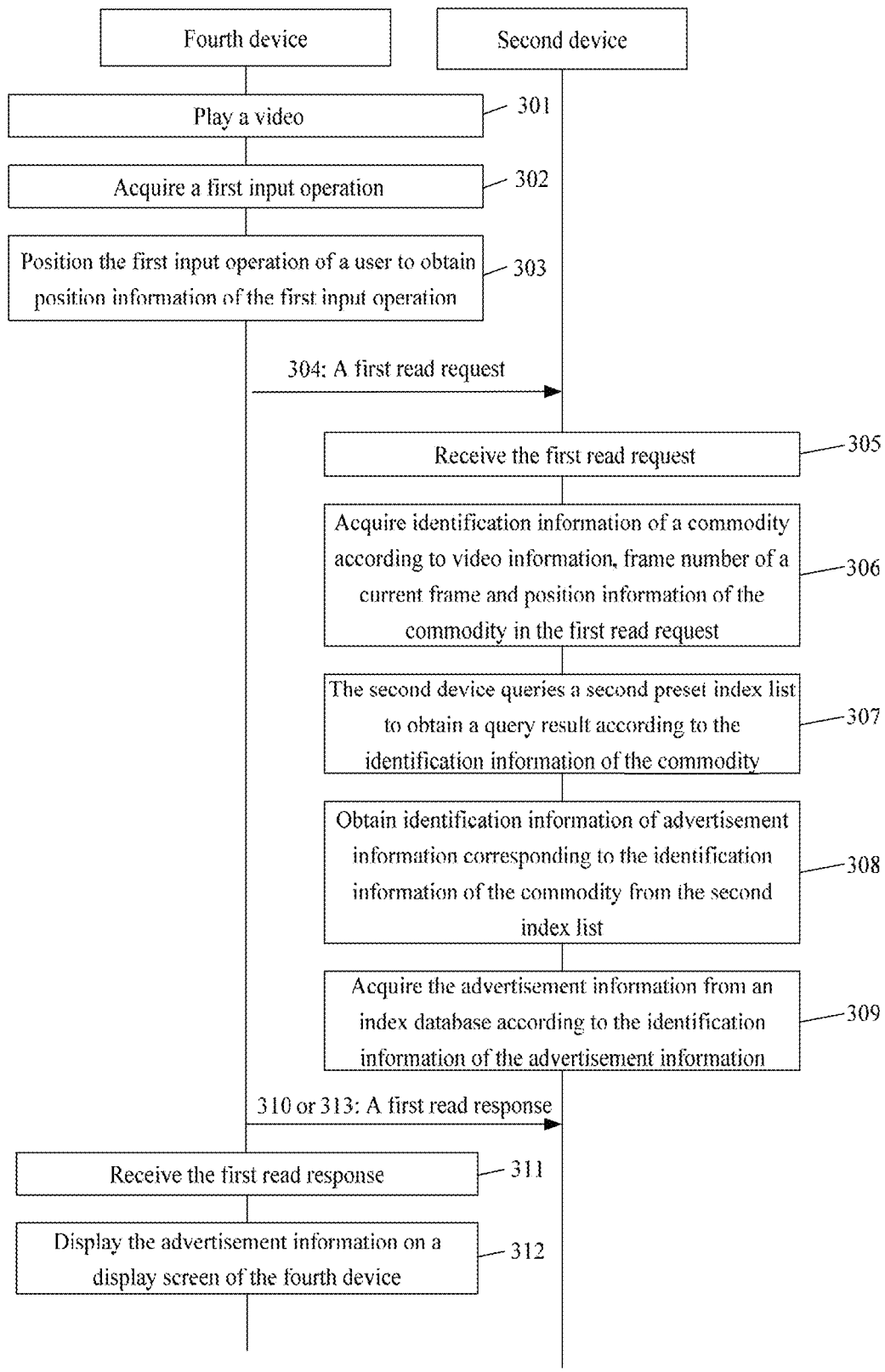
FIG. 3 is an implementation flowchart of an information processing method according to an embodiment of the disclosure.

An embodiment of the disclosure provides an information processing method. FIG. 3 is an implementation flowchart of an information processing method according to the embodiment of the disclosure. As shown in FIG. 3, the information processing method includes the following steps.

In Step 301, a fourth device is playing a video.

Here, a video playing process of the fourth device may refer to Step 103 in FIG. 1C, and thus will not be elaborated herein.

In Step 302, the fourth device acquires a first input operation for selecting a commodity in a current frame of the video.

In Step 303, the fourth device positions the first input operation of a user to obtain position information of the first input operation.

In Step 304, the fourth device contains the position information of the commodity in a first read request, and sends the first read request to a second device.

Here, the first read request contains video information of the video, a frame number of the current frame and the position information of the commodity, and the first read request is used to request for advertisement information of the commodity corresponding to the video information, the frame number of the current frame and the position information of the commodity.

In Step 305, the second device receives the first read request.

In Step 306, the second device acquires identification information of the commodity according to the video information, frame number of the current frame and position information of the commodity in the first read request.

Here, in Step 306, a server receives the video information of the video, the frame number of the current frame and the position information of the first input operation (the position information of the commodity), and then the server acquires the identification information of the commodity according to a first index list shown in FIG. 2D.

In Step 307, the second device queries a second preset index list to obtain a query result according to the identification information of the commodity.

Here, the query result is used to indicate whether there is the advertisement information corresponding to the identification information of the commodity in an index database or not.

In Step 308, when the query result indicates that there is the advertisement information corresponding to the identification information of the commodity in the index database, the second device obtains identification information of the advertisement information corresponding to the identification information of the commodity from the second index list.

In Step 309, the second device acquires the advertisement information from the index database according to the identification information of the advertisement information.

In Step 310, the second device contains the advertisement information in a first read response, and sends the first read response to the fourth device.

In Step 311, the fourth device receives the first read response.

Here, the first read response contains the advertisement information.

In Step 312, the fourth device displays the advertisement information on a display screen of the fourth device.

Here, Step 304 to Step 312 actually provide a specific implementation process of the operation, i.e., "the fourth device acquires the advertisement information according to the corresponding video information of the video, the frame number of the current frame and the position information of the commodity".

In Step 313, when the query result indicates that there is no advertisement information corresponding to the identification information of the commodity in the index database, the second device contains the query result in the first read response, and sends the first read response to the fourth device.

Figure 4:
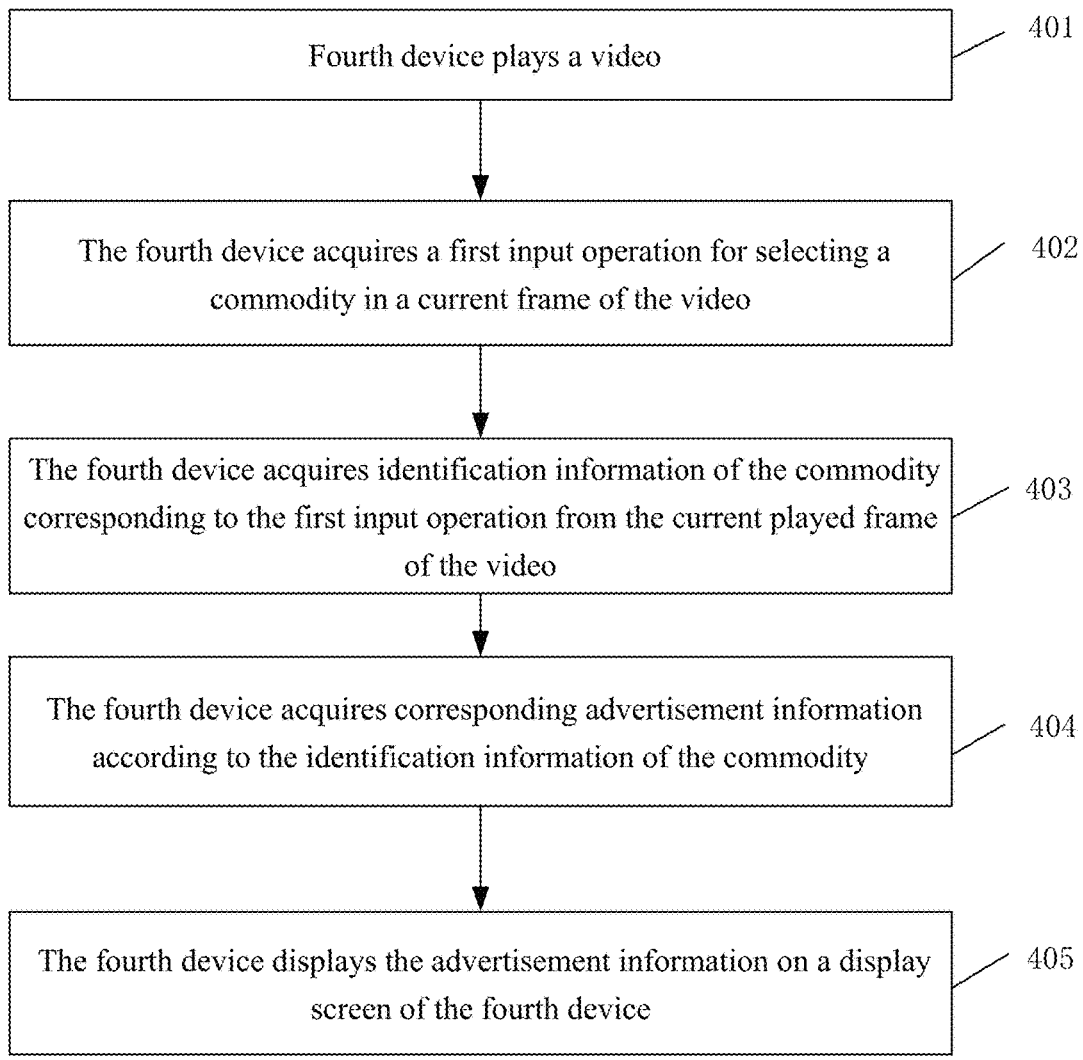
FIG. 4 is an implementation flowchart of an information processing method according to an embodiment of the disclosure.

Based on the abovementioned embodiments, an embodiment of the disclosure provides an information processing method. FIG. 4 is an implementation flowchart of an information processing method according to the embodiment of the disclosure. As shown in FIG. 4, the method includes the following steps.

In Step 401, a fourth device is playing a video.

In Step 402, the fourth device acquires a first input operation for selecting a commodity in a current frame of the video.

In Step 403, the fourth device acquires identification information of the commodity corresponding to the first input operation from the current played frame of the video.

In Step 404, the fourth device acquires advertisement information according to the corresponding identification information of the commodity.

In Step 405, the fourth device displays the advertisement information on a display screen of the fourth device.

In the embodiment of the disclosure, Step 404 may be implemented in the following four manners.

A first manner: the fourth device locally acquires the advertisement information of the commodity according to the identification information of the commodity, and the advertisement information of the commodity is obtained together with the video requested from a second device by the fourth device.

Here, the fourth device may be a terminal of a user, and the second device may be a server which provides the video.

Here, the terminal stores a second preset index list, and the terminal may query the second index list to acquire the advertisement information according to the identification information of the commodity. For example, a first address may be set in the second index list, then the second index list is queried to acquire the first address according to the identification information of the commodity, and the advertisement information of the commodity is acquired according to the first address, here, the first address is a storage address of the advertisement information of the commodity.

In the first manner, the server sends the advertisement information of the commodity together with the video resource requested by the terminal, so that the first manner may be implemented more rapidly, and is unlikely to be influenced by a network speed and the like. It is to be noted that there is no need to display the advertisement information of the commodity when the user does not execute the first input operation and the request for the advertisement information of the commodity together when the terminal requests the server for the video resource may cause bandwidth waste. However, such waste is actually very little because the advertisement information of the commodity contains mostly text(s), picture(s) and URL(s), and the bandwidth occupied by the text(s), the picture(s) and the URL(s) and the bandwidth occupied by the video are at different orders of magnitude. The first manner can be implemented more rapidly, and is short in delay. As the user is sensitive to delay, the first manner is a preferred manner for implementing Step 411.

A second manner: the second device calls a search engine, and acquires the advertisement information corresponding to an identifier of the commodity through the search engine.

Here, the terminal converts the identification information of the commodity into a search keyword, which may be attribute information such as a name of the commodity. If the identification information of the commodity is also the name of the commodity, the search engine is directly called without performing conversion, and the advertisement information of the commodity is acquired by virtue of the name of the commodity through the search engine. It is to be noted that identification information of the video may also be contained in a search process, so that consistency between the found advertisement information and video information may be ensured. By the method provided by the embodiment of the disclosure, benefits of the user may be ensured, because at most times, the user does not care about where these advertisements come from but cares about whether commodities reflected by these advertisements are consistent with commodities in videos or not. In order to improve user experiences, in the search process, some trusted shopping websites may be set, and advertisement information of commodities provided by these shopping websites are preferentially provided, wherein priorities may be set for the shopping websites to indicate whether they are trusted or not, evaluation parameters of the priorities may include scales, credibility, security and the like of the websites, and the shopping website with the highest priority is arranged at the top. In order to ensure benefits of a video provider, the video provider may cooperate with an advertiser to present advertisement information of a commodity, provided by the cooperating advertiser, to the user.

A third manner: Steps 4041 to 4044 are included, specifically as follows.

In Step 4041, the fourth device sends the identification information of the commodity to the second device, to trigger the second device to acquire the advertisement information of the commodity according to the identification information of the commodity and send the advertisement information of the commodity to the fourth device.

Here, the fourth device refers to a server which pushes the video to the terminal.

In Step 4042, the fourth device receives the identification information sent by the second device, then queries a second index list to acquire a first address, and acquires the advertisement information of the commodity according to the first address.

Here, the second index list and the first address are the same as those in the first manner, and thus will not be elaborated.

In Step 4043, the second device sends the advertisement information of the commodity to the fourth device.

In Step 4044, the fourth device receives the advertisement information of the commodity from the second device.

In the third manner, since the fourth device needs to send a request to the second device, the third manner may have a certain delay compared with the first manner.

A fourth manner: the following four steps are included.

In Step 4045, the fourth device queries a second preset index list to obtain a query result according to the identification information of the commodity The query result may indicate whether there is the advertisement information corresponding to the identification information of the commodity in an index database or not.

In Step 4046, when the query result indicates that there is the advertisement information corresponding to the identification information of the commodity in the index database, the fourth device obtains identification information of the advertisement information corresponding to the identification information of the commodity from the second index list.

In Step 4047, the fourth device acquires the advertisement information from the index database according to the identification information of the advertisement information.

In Step 4048, when the query result indicates that there is no advertisement information corresponding to the identification information of the commodity in the index database, the fourth device sends the identification information of the commodity to the second device, to trigger the second device to acquire the advertisement information of the commodity according to the identification information of the commodity and send the advertisement information of the commodity to the fourth device.

In Step 4049, the fourth device receives the advertisement information of the commodity from the second device.

The fourth manner is a compromise solution of the first manner and the third manner, and in the fourth manner, not advertisement information of all commodities may be requested together with the video resource, so that whether the advertisement information of the commodity is stored or not may be judged at first, wherein Step 4048 is the same as the third manner, and thus will not be elaborated.

Compared with the technical solution of the embodiment described above with reference to FIG. 1C, the technical solution provided by the present embodiment of the disclosure has the following beneficial effects: in the embodiment, the terminal pauses the video at first, and then determines the identification information of the commodity to be requested according to the first input operation of the user. Pausing is executed because the commodity in which the user is interested is involved in only a few frames in a video playing process. In other words, in such a short time, if the terminal presents the acquired advertisement information of the commodity to the user, it is very likely that the play of the interesting commodity has been ended before the user reads the advertisement information of the commodity. Therefore, a pausing operation is added in the technical solution provided by the embodiment of the disclosure.

Figure 5:
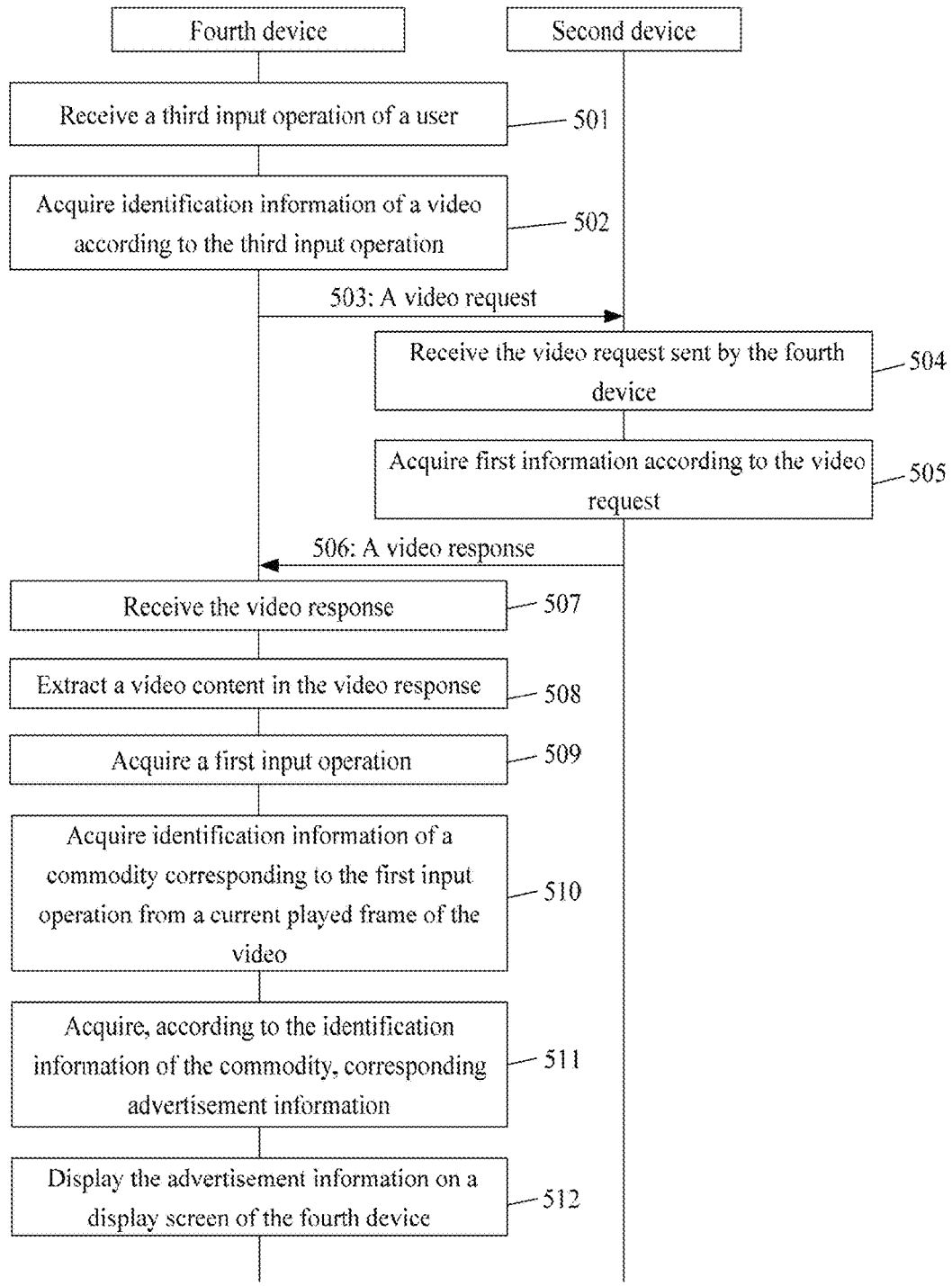
FIG. 5 is an implementation flowchart of an information processing method according to an embodiment of the disclosure.

An embodiment of the disclosure provides an information processing method. FIG. 5 is an implementation flowchart of an information processing method according to the embodiment of the disclosure. As shown in FIG. 5, the information processing method includes the following steps.

In Step 501, a fourth device receives a third input operation of a user, the third input operation being requesting for playing a video by the user.

Here, the fourth device may be a terminal of the user, e.g., an electronic device which provides a video playing function such as a smart phone, a tablet computer, a PC and the like. In a specific implementation process, the user may open a video playing website or a video playing APP, enter a video interface provided by a video provider and click on the video interface, and in such a manner, the fourth device receives the third input operation of the user.

In Step 502, the fourth device acquires identification information of a video according to the third input operation.

Here, the identification information of the video may be attribute information such as a sequence number and name of the video.

In Step 503: the fourth device contains the identification information of the video in a video request, and sends the video request to a second device.

Here, the video request is used to request for first information corresponding to the identification information of the video, and the first information includes a video content to be played, advertisement information of a commodity appearing in the video, a second index list and the like.

In Step 504, the second device receives the video request sent by the fourth device.

In Step 505, the second device acquires first information according to the video request.

In Step 506, the second device contains the first information in a video response, and sends the video response to the fourth device.

In Step 507, the fourth device receives the video response.

In Step 508, the fourth device extracts the video content in the video response to play the video.

Here, the video playing process of the fourth device may refer to Step 103 in the embodiment described above with reference to FIG. 1C, and thus will not be elaborated.

In Step 509, the fourth device acquires a first input operation, the first input operation being used to select a commodity in a current frame of the video.

In Step 510, the fourth device acquires identification information of the commodity corresponding to the first input operation from the current played frame of the video.

Here, the operation that the fourth device acquires the identification information of the commodity corresponding to the first input operation from the current played frame of the video in Step 510 may refer to Step 203.

In Step 511, the fourth device acquires advertisement information according to the corresponding identification information of the commodity.

Here, a specific implementation process of Step 511 in which "the fourth device acquires the corresponding advertisement information according to the identification information of the commodity" may refer to Step 206 to Step 208 in the embodiment, and it is to be noted that the implementation process in the embodiment is completed in the second device while that in the embodiment described above with reference to FIG. 4 is completed in the fourth device, in other words, Step 206 to Step 208 may be executed by the second device, or may be executed by other device such as the fourth device.

In Step 512, the fourth device displays the advertisement information on a display screen of the fourth device.

Figure 6:
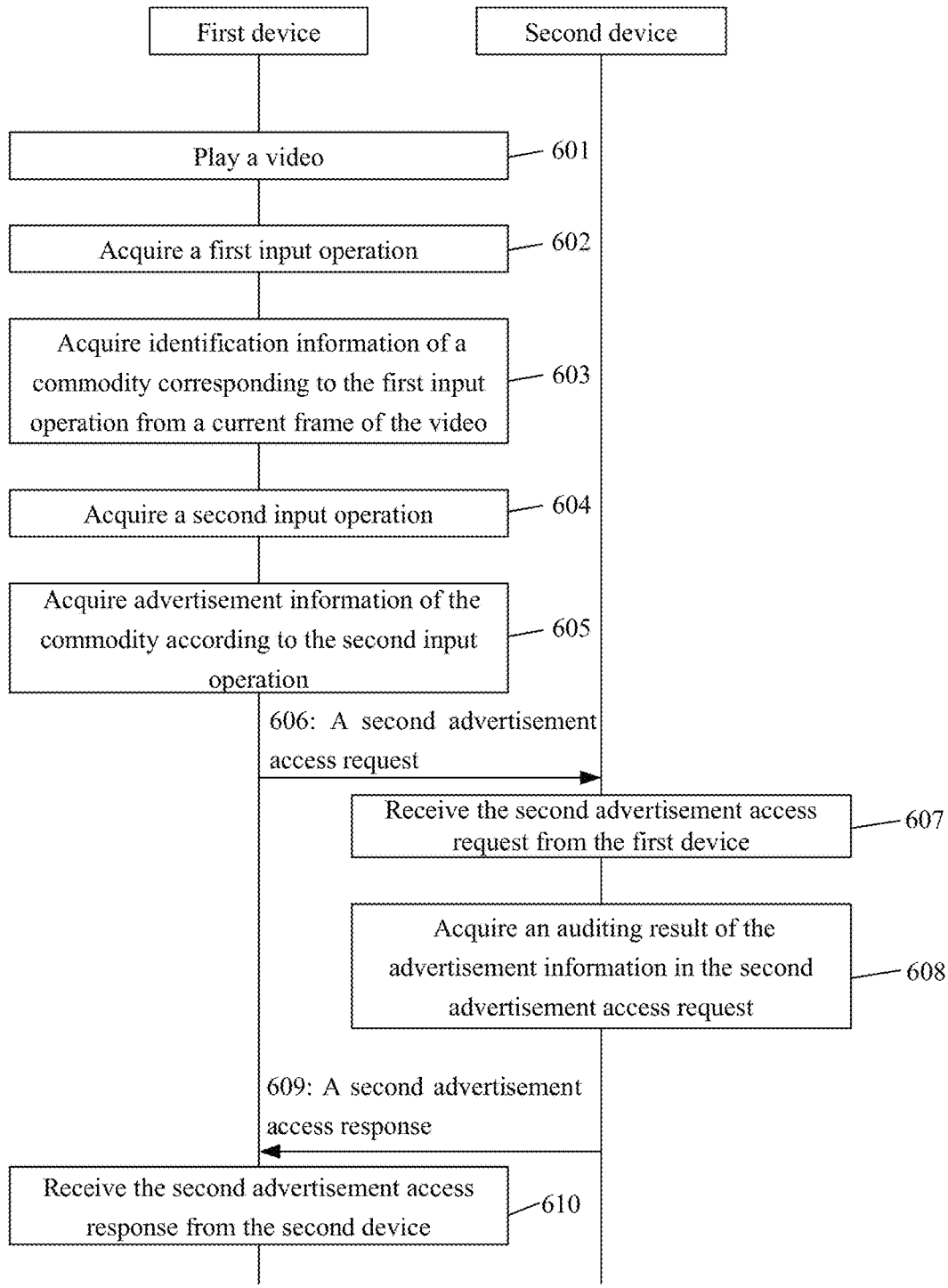
FIG. 6 is an implementation flowchart of an information processing method according to an embodiment of the disclosure.

An embodiment of the disclosure provides an information processing method. FIG. 6 is an implementation flowchart of an information processing method according to the embodiment of the disclosure. As shown in FIG. 6, the information processing method includes the following steps.

In Step 601, a first device is playing a video.

Here, the first device may be different from a second device, or, of course, may right be the second device. When the first device is the second device, the first device may provide advertisement access of one or more commodities for a video provider according to an advertisement content provided by an advertiser. When the first device is different from the second device, the first device may provide advertisement access for the advertiser. In a specific implementation process, the technical solution provided by the embodiment of the disclosure may be presented in a form of a video APP. In the embodiment, the video APP may have three and even four interfaces, each presenting respective contents. For example, a first interface of the video APP is a video requesting interface provided for a user watching the video, a second interface of the video APP provides an advertisement access interface, a third interface of the video APP provides a video access interface, and a fourth interface of the video APP is an advertisement or video auditing interface. It is to be noted that the advertisement access interface, the video access interface and the advertisement or video auditing interface may all be implemented on the second device (a video server), but the video requesting interface is implemented on the fourth device (a terminal).

In Step 602, the first device acquires a first input operation of selecting a commodity in a current played frame of the video.

Here, continue with Step 601, assuming that the first device is different from the second device, the first input operation is a merchant.

In Step 603, the first device acquires identification information of the commodity corresponding to the first input operation from the current frame of the video.

Here, the operation that the first device acquires the identification information of the commodity corresponding to the first input operation from the current frame of the video in Step 603 includes the following steps.

In Step 6031, the first device positions the first input operation of the user to obtain position information of the first input operation.

In Step 6032, the first device acquires video information of the video and a frame number of the current frame.

In Step 6033, the first device determines the identification information of the commodity according to the video information of the video, the frame number of the current frame and the position information of the first input operation.

Here, a specific implementation process of Step 6031 to Step 6033 may refer to Step 203 in the embodiment described above. It is to be noted that Step 203 is executed by the fourth device while Step 603 in the embodiment is executed by the first device. In other words, it may be either the first device or another apparatus such as the fourth device which acquires the identification information of the commodity corresponding to the first input operation from the current frame of the video.

In Step 604, the first device acquires a second input operation for inputting advertisement information of the commodity.

Here, the second input operation may be an operation of providing the advertisement information for the merchant.

In Step 605, the first device acquires the advertisement information of the commodity according to the second input operation.

In Step 606, the first device sends a second advertisement access request to a second device, the second advertisement access request containing the identification information and advertisement information of the commodity.

In Step 607, the second device receives the second advertisement access request sent by the first device.

In Step 608, the second device acquires an auditing result of the advertisement information in the second advertisement access request for indicating whether the advertisement information passes an audit.

Here, a specific implementation process of Step 608 includes the following three implementation manners.

A first manner: in response to the second advertisement access request, the second device audits the advertisement information in the second advertisement access request to obtain the auditing result.

A second manner: in response to the second advertisement access request, the second device sends a first prompt for prompting an auditor of auditing the advertisement information; and the second device acquires the auditing result according to an operation of the auditor.

A third manner: in response to the second advertisement access request, the second device sends to a third device an auditing request for requesting the auditor to audit the advertisement information; and the second device receives the auditing result sent by the third device.

Here, the auditing request in the third manner may contain the advertisement information, or may not contain the advertisement information. When the advertisement information is contained, the auditor or the third device directly audits the advertisement information. When the advertisement information is not contained, the third device requests the second device for the advertisement information, then the auditor or the third device audits the advertisement information, and the third device finally sends the auditing result to the second device.

Here, auditing the advertisement information in the second advertisement access request to obtain the auditing result may be manual auditing of the auditor at the second device (the second manner), or may be automatic auditing by the second device (the first manner), or may be sending an advertisement content to the third device by the second device (the third manner) for either manual auditing of the auditor at the third device or automatic auditing by the third device, where the content being audited includes a picture, text and webpage address in the advertisement information, the auditing condition may be whether the advertisement information is matched with the identification information of the commodity or not and whether the advertisement information includes an illegal content or not, and whether the illegal content includes at least one of a pornographic content, a dirty word, a phishing site, fraud and the like.

In Step 609, the second device contains the auditing result in a second advertisement access response, and sends the second advertisement access response to the first device.

In Step 610, the first device receives the second advertisement access response sent by the second device, the second advertisement access response containing the auditing result.

Here, the auditing result is used to indicate whether the advertisement information passes the audit or not.

Figure 7:
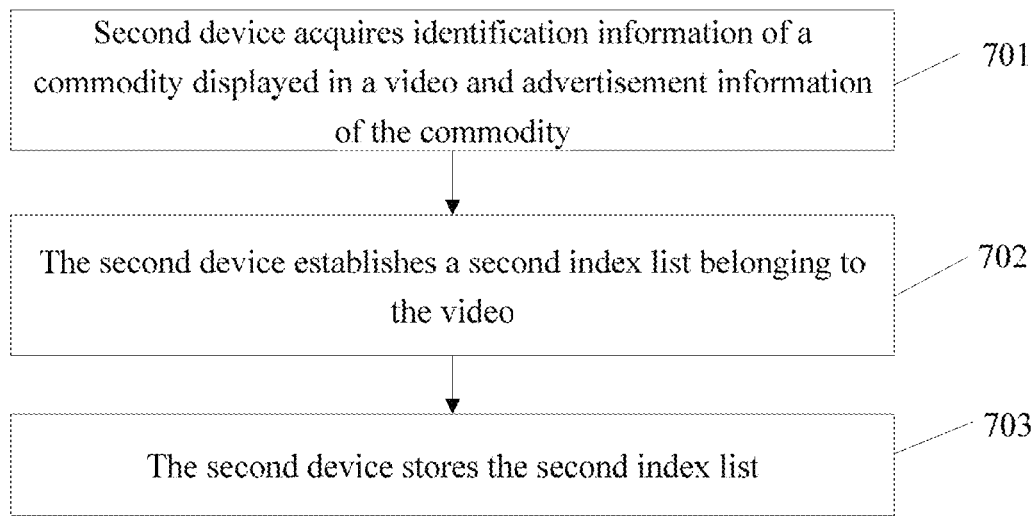
FIG. 7 is a flowchart of establishing a second index list according to an embodiment of the disclosure.

An embodiment of the disclosure provides a method for establishing a second index list in the embodiment described above with reference to FIGS. 2A to 2E. FIG. 7 is a flowchart of establishing a second index list according to the embodiment of the disclosure. As shown in FIG. 7, the method includes the following steps.

In Step 701, a second device acquires identification information of a commodity displayed in a video and advertisement information of the commodity.

In Step 702, the second device establishes a second index list associated with the video.

Here, the second index list is used to indicate a mapping relationship between identification information of a commodity appearing in the video and identification information of advertisement information of the commodity.

In Step 703, the second device stores the second index list.

Three manners for implementing Step 701 will be provided below.

A first manner: the operation that the second device acquires the identification information of the commodity displayed in the video and the advertisement information of the commodity in Step 701 includes that: the second device receives a second advertisement access request sent by a first device, the second advertisement access request containing the identification information of the commodity and the advertisement information of the commodity.

Here, the first device is a device of an advertiser, the advertiser inputs the advertisement information on its own client (i.e. the advertisement access interface of the video APP), and then the first device sends the advertisement information to the second device in a second advertisement access request.

A second manner: the operation that the second device acquires the identification information of the commodity displayed in the video in Step 701 includes the following steps.

In Step 7011, the second device is playing the video.

In Step 7012, the second device acquires a first input operation, the first input operation being used to select the commodity in a current played frame of the video.

In Step 7013, the second device acquires the identification information of the commodity corresponding to the first input operation from the current played frame of the video.

In Step 7014, the second device acquires a second input operation, the second input operation being used to input the advertisement information of the commodity.

Here, in the second manner, a video provider adds an advertisement for the commodity in an advertisement database. Generally speaking, the video provider and the advertiser have a contract or agreement about a number of exposure or access times of the advertisement. Then, after the advertiser provides the advertisement information for the video provider, the video provider implements advertisement access in the video, so that the advertiser does not need to manually add the advertisement information per se.

A third manner: the operation that the second device acquires the identification information of the commodity displayed in the video and the advertisement information of the commodity in Step 701 includes the following steps.

In Step 7015, the second device acquires frame number information of the current frame in the video.

In Step 7016, the second device acquires the identification information of the commodity in the current frame according to the frame number information of the current frame.

In Step 7017, the second device acquires the advertisement information of the commodity from an advertisement database according to the identification information of the commodity.

Here, the technical solution provided by the third manner is actually a completely automatic solution on the second device, and the second device acquires the advertisement information according to the identification information of the commodity in the video by itself, and then establishes a mapping relationship table between the identification information and advertisement information of the commodity, where the mapping relationship table may also include position information of the commodity in an implementation process.

Figure 8:
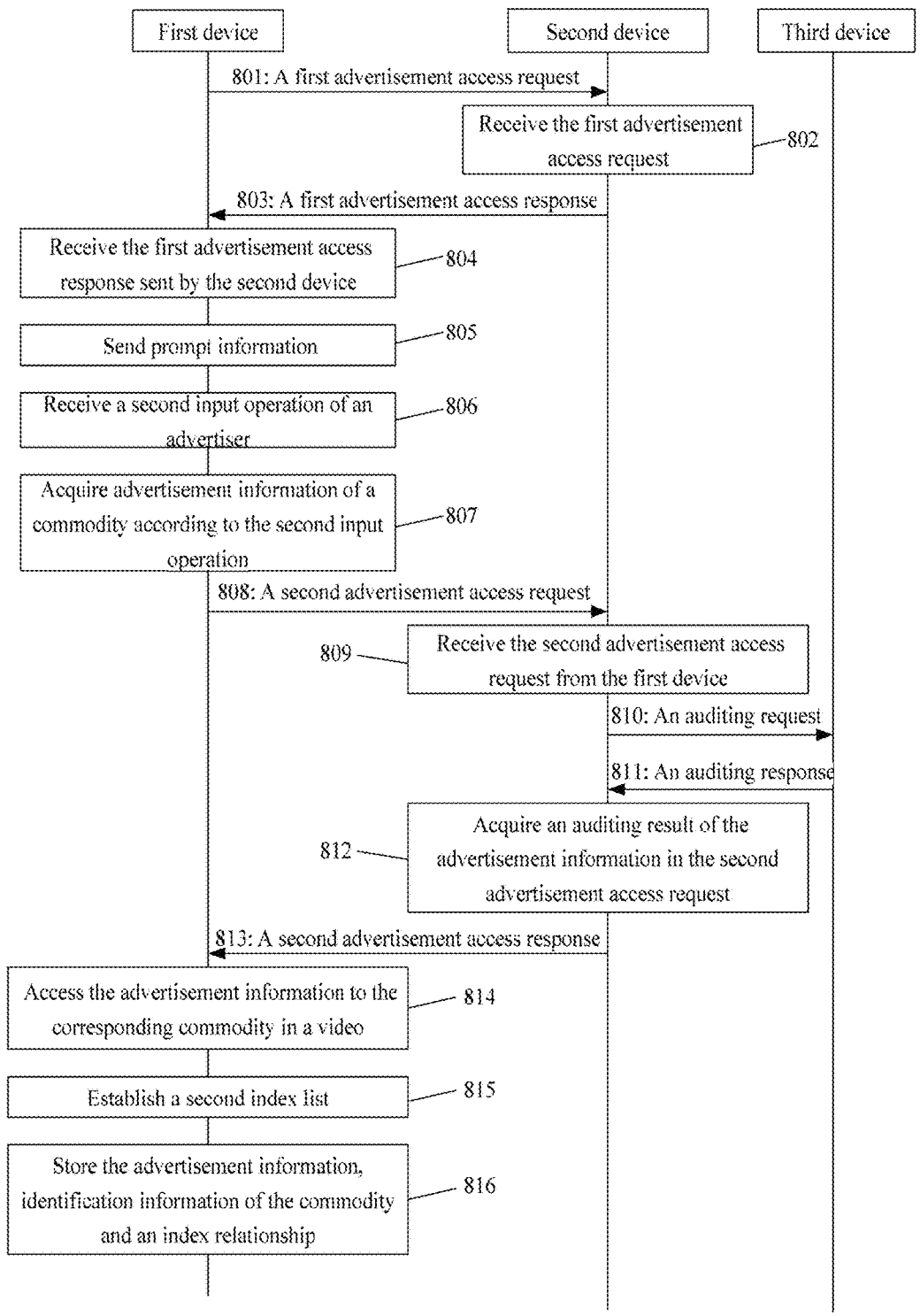
FIG. 8 is an implementation flowchart of an information processing method according to an embodiment of the disclosure.

An embodiment of the disclosure provides an information processing method. FIG. 8 is an implementation flowchart of an information processing method according to the embodiment of the disclosure. As shown in FIG. 8, the method includes the following steps.

In Step 801, the first device sends a first advertisement access request of an advertiser to a second device, the first advertisement access request containing identification information of a commodity appearing in a video.

Here, the first device is different from the second device, and the first device is a device of the advertiser.

In Step 802, the second device receives the first advertisement access request, and determines response information according to the identification information of the commodity.

Here, the response information is used to indicate whether to authorize access to advertisement information, provided by the advertiser, of the commodity corresponding to the identification information of the commodity.

Here, the first advertisement access request may further include information of the advertiser and information of the commodity. Then, the second device audits the related information in the access request, allows advertisement access of the advertiser to the commodity after the information passes the audit, and does not allow advertisement access of the advertiser if the information does not pass auditing. Whether access is allowed or not may be contained in a first advertisement access response as the response information.

In Step 803, the second device contains the response information in a first advertisement access response, and sends the first advertisement access response to the first device.

In Step 804, the first device receives the first advertisement access response sent by the second device.

In Step 805, when the response information in the first advertisement access response indicates to authorize access to the advertisement information, provided by the advertiser, of the commodity corresponding to the identification information of the commodity, the first device sends prompt information.

Here, the prompt information is used to prompt the advertiser of inputting the advertisement information of the commodity, and the advertisement information of the commodity includes attribute information such as origin, commodity name, price and etc. of the commodity.

In Step 806, the first device receives a second input operation of the advertiser, the second input operation being configured to provide advertisement information of the commodity.

In Step 807, the first device acquires the advertisement information of the commodity according to the second input operation.

In Step 808, the first device sends a second advertisement access request to the second device, the second advertisement access request containing the identification information and advertisement information of the commodity.

In Step 809, the second device receives the second advertisement access request sent by the first device.

In Step 810, the second device sends an auditing request to a third device in response to the second advertisement access request.

Here, the auditing request is used to request an auditor to audit the advertisement information. The auditing request may contain the advertisement information, or may not contain the advertisement information. When the auditing request contains the advertisement information, the auditor directly audits the advertisement information, and the third device acquires an auditing result according to an operation of the auditor. When the advertisement information is not contained, the third device receives the operation of the advertisement auditor, and requests the second device for the advertisement information, then the third device receives the advertisement information sent by the second device, the auditor audits the advertisement information, and the third device acquires the auditing result according to the operation of the auditor.

In Step 811, the third device contains an auditing result in an auditing response for sending to the second device.

In Step 812, the second device acquires the auditing result of the advertisement information in the second advertisement access request, the auditing result being used to indicate whether the advertisement information passes the audit.

In Step 813, the second device contains the auditing result in a second advertisement access response, and sends the second advertisement access response to the first device.

In Step 814, when the auditing result indicates that the advertisement information passes the audit, the second device accesses the advertisement information to the corresponding commodity in the video.

In Step 815, the second device establishes a second index list.

Here, the second index list is used to indicate a mapping relationship between identification information of a commodity and identification information of advertisement information.

In Step 816, the second device stores the advertisement information, the identification information of the commodity and an index relationship.

Here, the advertisement information is stored in an index database according to the identification information of the advertisement information.

Based on the abovementioned information processing method, an embodiment of the disclosure provides a second information processing apparatus. The second information processing apparatus includes a first acquisition unit, a second acquisition unit, a first containing unit and a first sending unit. These units and modules included in each unit in the second information processing apparatus may be implemented through a processor in the second device, or, of course, may be implemented through a specific logic circuit. In a specific implementation process, the processor may be a Central Processing Unit (CPU), a Micro Processing Unit (MPU), a Digital Signal Processor (DSP), a Field-Programmable Gate Array (FPGA) or the like.

Figure 9:
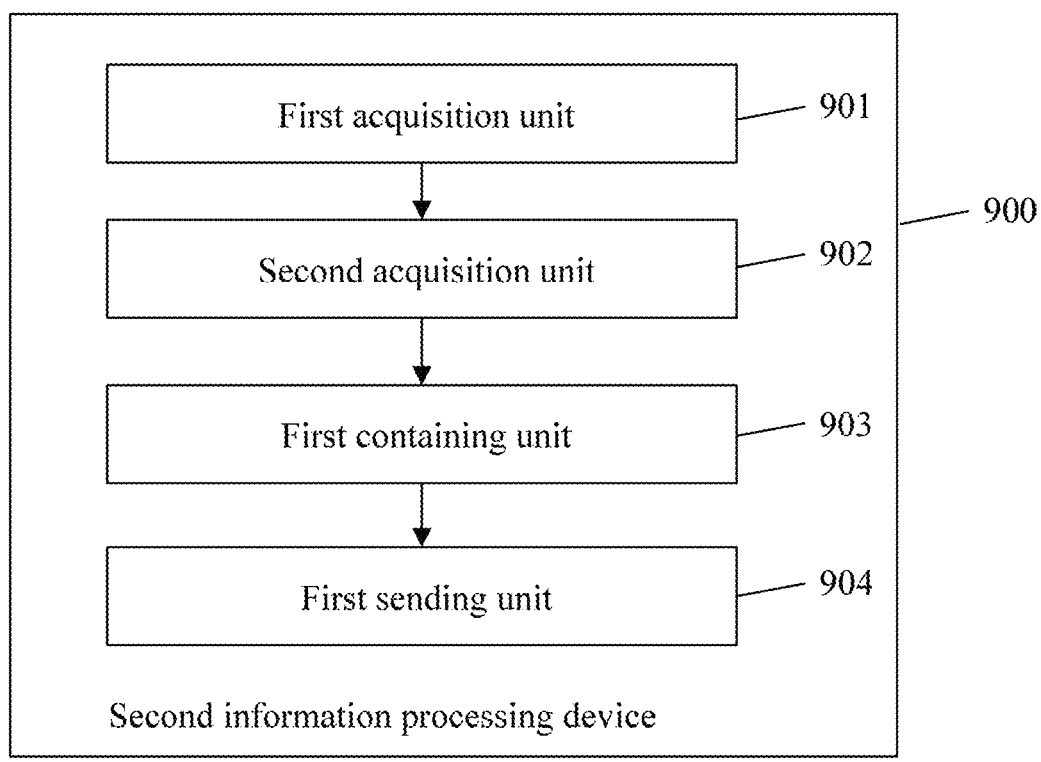
FIG. 9 is a structure diagram of a second device according to an embodiment of the disclosure.

FIG. 9 is a structure diagram of a second information processing apparatus according to the embodiment of the disclosure. As shown in FIG. 9, the second information processing apparatus 900 includes the first acquisition unit 901, the second acquisition unit 902, the first containing unit 903 and the first sending unit 904.

The first acquisition unit 901 is configured to acquire identification information of a commodity.

The second acquisition unit 902 is configured to acquire advertisement information according to the corresponding identification information of the commodity.

The first containing unit 903 is configured to contain the advertisement information in a first read response.

The first sending unit 904 is configured to send the first read response to a fourth device.

In the embodiment of the disclosure, two implementation manners are adopted for the first acquisition unit.

A first manner: the first acquisition unit is configured to receive a first read request, the first read request containing the identification information of the commodity and the first read request being used to request for the advertisement information of the commodity corresponding to the identification information of the commodity.

A second manner: the first acquisition unit includes a first receiving module and a determination module.

The first receiving module is configured to receive the first read request, the first read request containing video information of a video, a frame number of a current frame and position information of the commodity and the first read request being used to request for the advertisement information of the commodity corresponding to the video information, the frame number of the current frame and the position information of the commodity.

The first determination module is configured to determine the identification information of the commodity according to the video information, frame number of the current frame and position information of the commodity in the first read request.

Figure 10:
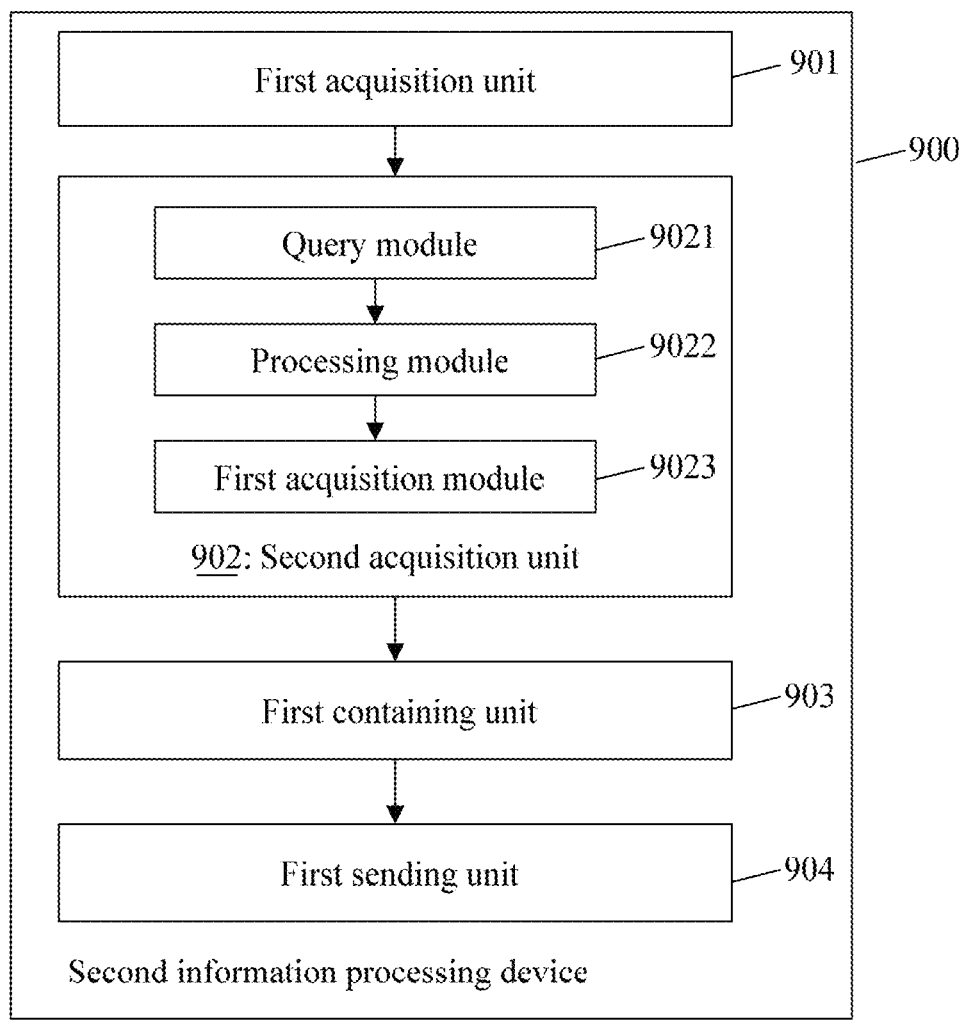
FIG. 10 is a structure diagram of a second device according to an embodiment of the disclosure.

In another embodiment of the disclosure, as shown in FIG. 10, the second acquisition unit 902 in the second information processing apparatus 900 includes a query module 9021, a processing module 9022 and a first acquisition module 9023.

The query module 9021 is configured to query a second preset index list to obtain a query result according to the identification information of the commodity, the query result being used to indicate whether there is the advertisement information corresponding to the identification information of the commodity in an index database or not.

The processing module 9022 is configured to, when the query result indicates that there is the advertisement information corresponding to the identification information of the commodity in the index database, obtain identification information of the advertisement information corresponding to the identification information of the commodity from the second index list.

The first acquisition module 9023 is configured to acquire the advertisement information from the index database according to the identification information of the advertisement information.

Correspondingly, the first sending unit is further configured to, when the query result indicates that there is no advertisement information corresponding to the identification information of the commodity in the index database, contain the query result in the first read response, and send the first read response to the fourth device.

Figure 11:
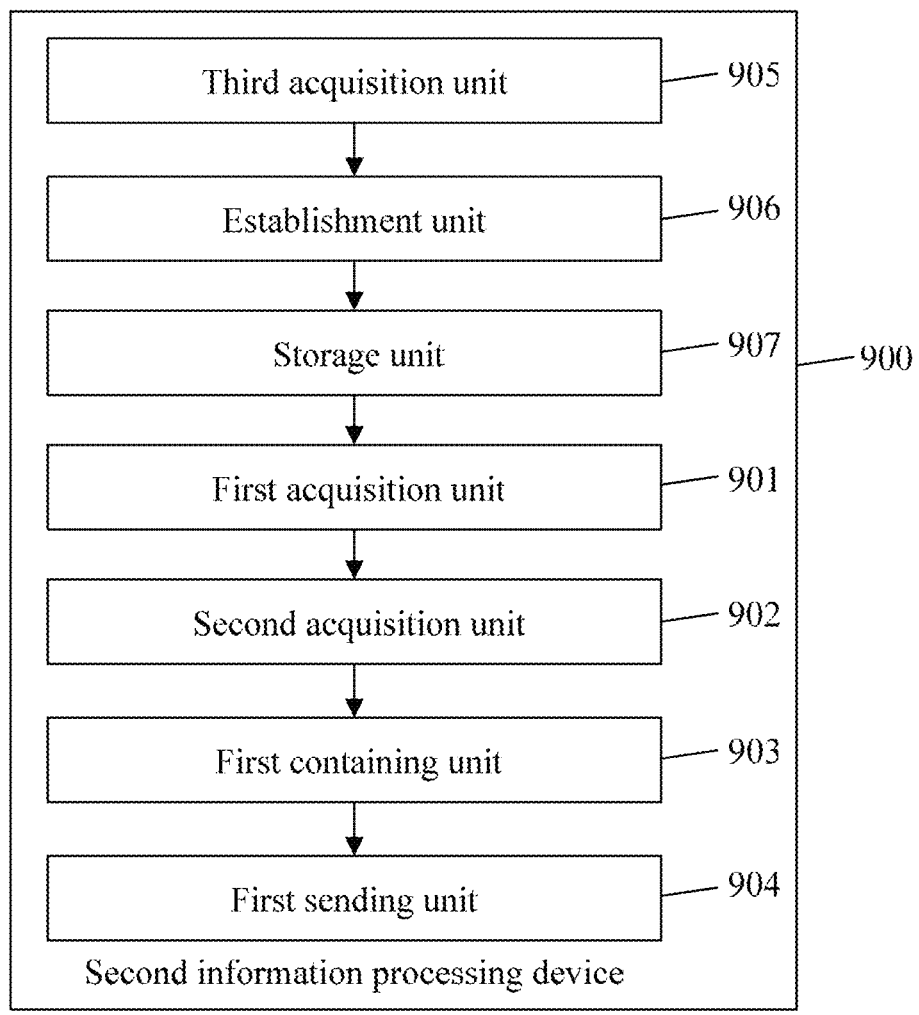
FIG. 11 is a structure diagram of a second device according to an embodiment of the disclosure.

In another embodiment of the disclosure, as shown in FIG. 11, the second information processing apparatus 900 includes a third acquisition unit 905, an establishment unit 906 and a storage unit 907.

The third acquisition unit 905 is configured to acquire the identification information of the commodity displayed in the video and the advertisement information of the commodity.

The establishment unit 906 is configured to establish the second index list of the video, the second index list being configured to indicate a mapping relationship between identification information of a commodity appearing in the video and identification information of advertisement information of the commodity.

The storage unit 907 is configured to store the second index list.

Here, the third acquisition unit may be implemented in three manners.

A first manner: the third acquisition unit is configured to receive a second advertisement access request sent by a first device, the second advertisement access request containing the identification information of the commodity and the advertisement information of the commodity.

A second manner: the third acquisition unit includes a playing module, a second acquisition module, a third acquisition module, a fourth acquisition module and a fifth acquisition module.

The playing module is configured to play the video.

The second acquisition module is configured to acquire a first input operation for selecting the commodity in the current played frame of the video.

The third acquisition module is configured to acquire the identification information of the commodity corresponding to the first input operation from the current played frame of the video.

The fourth acquisition module is configured to acquire a second input operation for inputting the advertisement information of the commodity.

The fifth acquisition module is configured to acquire the advertisement information of the commodity according to the second input operation.

A third manner: the third acquisition unit includes a sixth acquisition module, a seventh acquisition module and an eighth acquisition module.

The sixth acquisition module is configured to acquire frame number information of the current frame in the video.

The seventh acquisition module is configured to acquire the identification information of the commodity in the current frame according to the frame number information of the current frame.

The eighth acquisition module is configured to acquire the advertisement information of the commodity from an advertisement database according to the identification information of the commodity.

Figure 12:
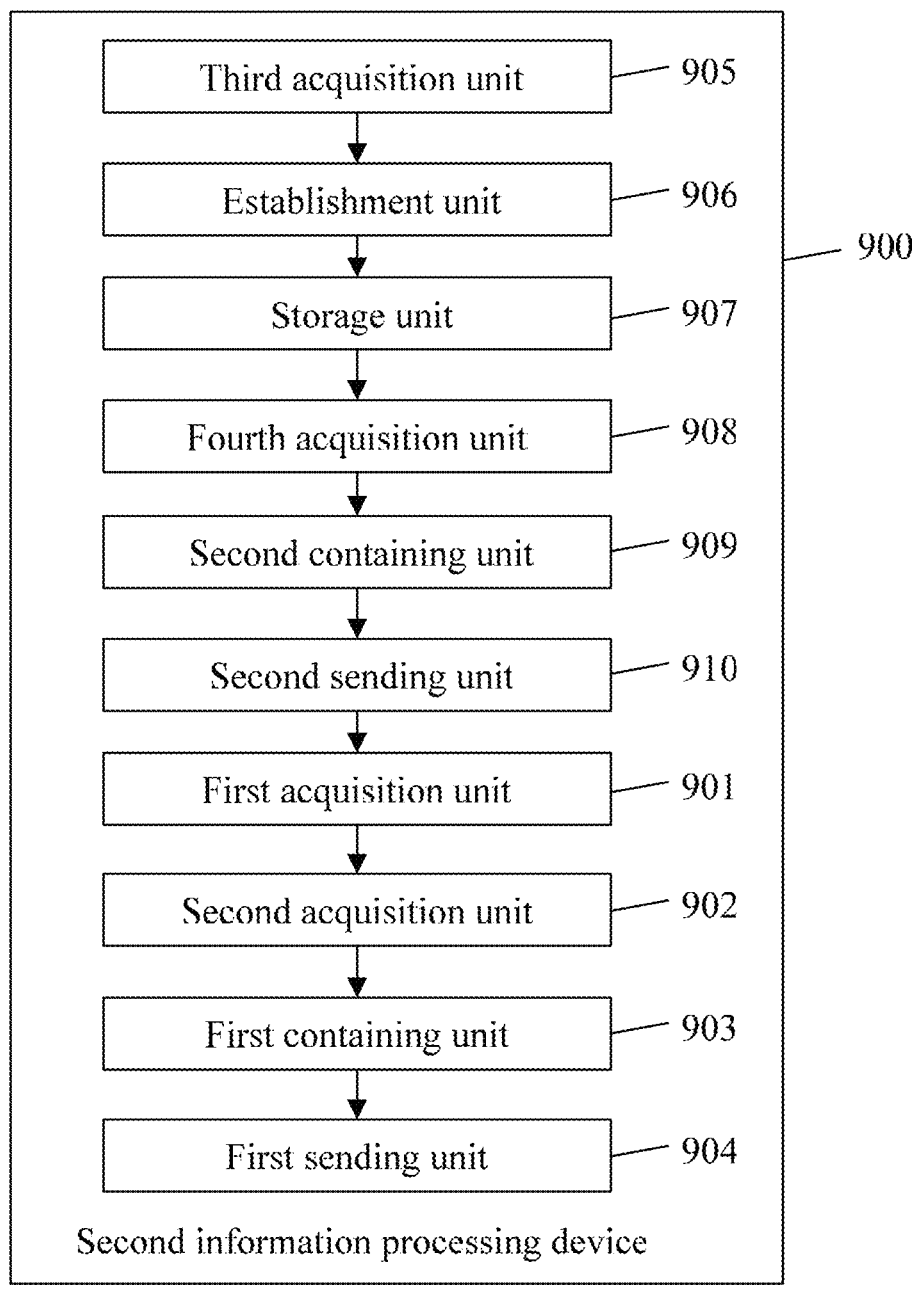
FIG. 12 is a structure diagram of a second device according to an embodiment of the disclosure.

In another embodiment of the disclosure, based on the embodiment shown in FIG. 11, as shown in FIG. 12, the second information processing apparatus 900 includes a fourth acquisition unit 908, a second containing unit 909 and a second sending unit 910.

The fourth acquisition unit 908 is configured to acquire an auditing result of the advertisement information in the second advertisement access request indicating whether the advertisement information passes the audit.

The second containing unit 909 is configured to contain the auditing result in a second advertisement access response.

The second sending unit 910 is configured to send the second advertisement access response to the first device.

In an embodiment of the disclosure, the second information processing apparatus may further include an auditing unit, or may further include a sending unit and a fifth acquisition unit, or may further include a third sending unit and a first receiving unit.

The auditing unit is configured to audit the advertisement information in the second advertisement access request to obtain the auditing result in response to the second advertisement access request.

Alternatively, the sending unit is configured to send a first prompt in response to the second advertisement access request, the first prompt being used to prompt an auditor of auditing the advertisement information, and the fifth acquisition unit is configured to acquire the auditing result according to an operation of the auditor.

Alternatively, the third sending unit is configured to send an auditing request to a third device in response to the second advertisement access request, the auditing request being configured to request the auditor to audit the advertisement information, and the first receiving unit is configured to receive the auditing result sent by the third device.

It is to be noted that: the above description about the embodiments of the second information processing apparatus are similar to the descriptions about the methods, have the same beneficial effects as those of the method embodiments, and thus will not be elaborated. For technical details undisclosed in the embodiment of the second information processing apparatus of the disclosure, those skilled in the art may refer to the description in the method embodiments, and no elaboration will be made herein.

Based on the abovementioned information processing method, an embodiment of the disclosure provides a first information processing apparatus, which includes a playing unit, a sixth acquisition unit, a seventh acquisition unit, an eighth acquisition unit, a ninth acquisition unit, a fourth sending unit and a second receiving unit. These units may all be implemented through a processor in a first device, or, of course, may be implemented through a specific logic circuit. In a specific implementation process, the processor may be a CPU, an MPU, a DSP, an FPGA or the like.

Figure 13:
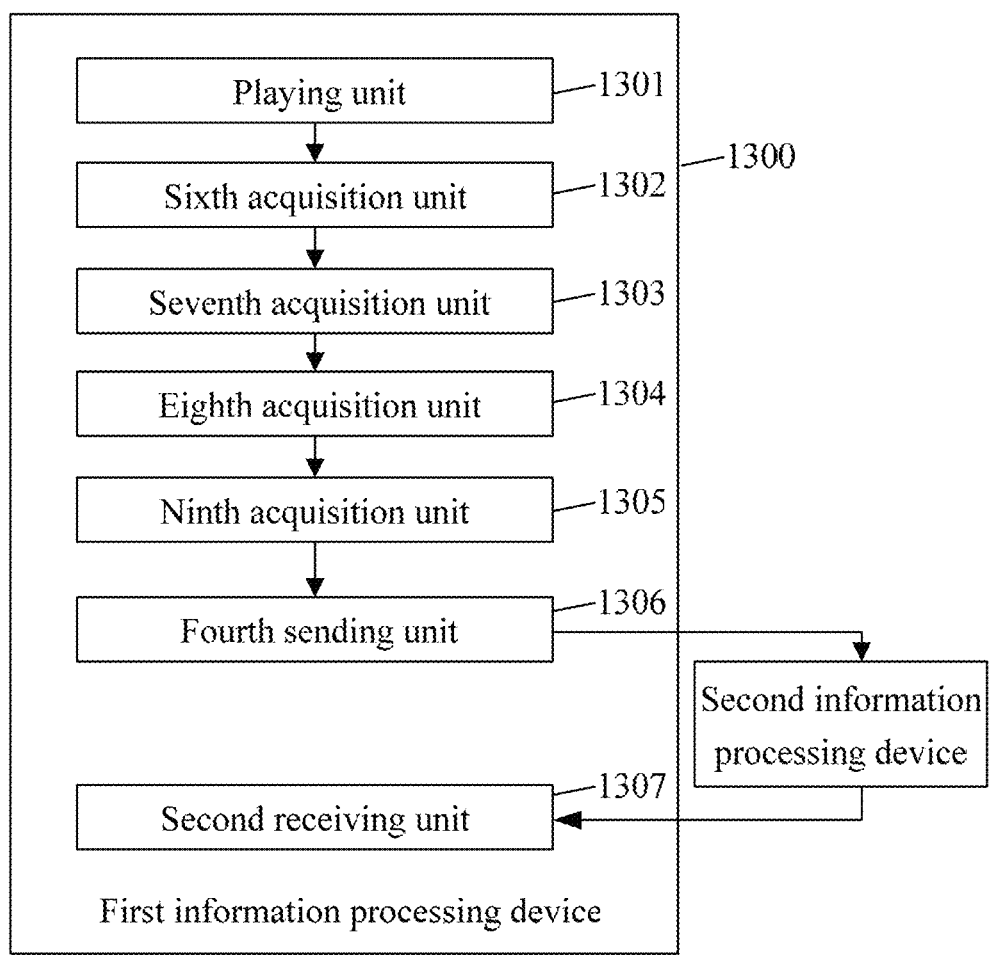
FIG. 13 is a structure diagram of a first device according to an embodiment of the disclosure.

FIG. 13 is a structure diagram of a first information processing apparatus according to the embodiment of the disclosure. As shown in FIG. 13, the first information processing apparatus 1300 includes the playing unit 1301, the sixth acquisition unit 1302, the seventh acquisition unit 1303, the eighth acquisition unit 1304, the ninth acquisition unit 1305, the fourth sending unit 1306 and the second receiving unit 1307.

The playing unit 1301 is configured to play a video.

The sixth acquisition unit 1302 is configured to acquire a first input operation for selecting a commodity in a current played frame of the video.

The seventh acquisition unit 1303 is configured to acquire identification information of the commodity corresponding to the first input operation from the current frame of the video.

The eighth acquisition unit 1304 is configured to acquire a second input operation for inputting advertisement information of the commodity.

The ninth acquisition unit 1305 is configured to acquire the advertisement information of the commodity according to the second input operation.

The fourth sending unit 1306 is configured to send a second advertisement access request to a second device, the second advertisement access request containing the identification information and advertisement information of the commodity.

The second receiving unit 1307 is configured to receive a second advertisement access response sent by the second device, the second advertisement access response containing an auditing result indicating whether the advertisement information passes the audit.

In the embodiment of the disclosure, the seventh acquisition unit includes a positioning module, a ninth acquisition module and a second determination module.

The positioning module is configured to position the first input operation of the user to obtain position information of the first input operation.

The ninth acquisition module is configured to acquire video information of the video and a frame number of the current frame.

The second determination module is configured to determine the identification information of the commodity according to the video information of the video, the frame number of the current frame and the position information of the first input operation.

It is to be noted that: the above description about the embodiment of the first information processing apparatus are similar to the descriptions about the methods, have the same beneficial effects as those of the method embodiments, and thus will not be elaborated. For technical details undisclosed in the embodiment of the first information processing apparatus of the disclosure, those skilled in the art may refer to the description in the method embodiments for understanding, and no elaboration will be made herein.

Based on the abovementioned information processing method, an embodiment of the disclosure provides a fourth information processing apparatus, which includes a playing unit, a sixth acquisition unit, a seventh acquisition unit, a tenth acquisition unit and a display unit. These units may all be implemented through a processor in the fourth device, and of course, may also be implemented through a specific logic circuit. In a specific implementation process, the processor may be a CPU, an MPU, a DSP, an FPGA or the like.

Figure 14:
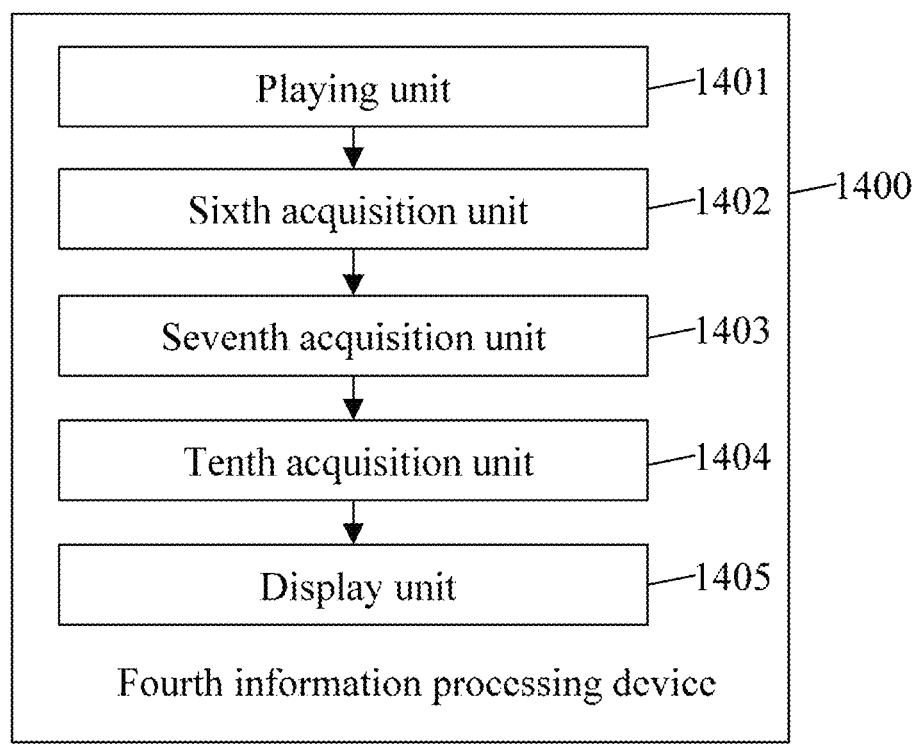
FIG. 14 is a structure diagram of a fourth device according to an embodiment of the disclosure.

FIG. 14 is a structure diagram of a fourth information processing apparatus according to an embodiment of the disclosure. As shown in FIG. 14, the fourth information processing apparatus 1400 includes the playing unit 1401, the sixth acquisition unit 1402, the seventh acquisition unit 1403, the tenth acquisition unit 1404 and the display unit 1405.

The playing unit 1401 is configured to play a video.

The sixth acquisition unit 1402 is configured to acquire a first input operation for selecting a commodity in a current frame of the video.

The seventh acquisition unit 1403 is configured to acquire identification information of the commodity corresponding to the first input operation from the current played frame of the video.

The tenth acquisition unit 1404 is configured to acquire advertisement information according to the corresponding identification information of the commodity.

The display unit 1405 is configured to display the advertisement information on a display screen of the fourth device.

In the embodiment of the disclosure, the tenth acquisition unit includes a containing module, a sending module and a second receiving module.

The containing module is configured to contain the identification information of the commodity in a first read request.

The sending module is configured to send the first read request to a second device, the first read request being used to request for the advertisement information of the commodity corresponding to the identification information of the commodity.

The second receiving module is configured to receive a first read response, the first read response containing the advertisement information.

It is to be noted that: the above description about the embodiment of the fourth information processing apparatus are similar to the description about the methods, have the same beneficial effects as those of the method embodiments, and thus will not be elaborated. For technical details undisclosed in the embodiment of the fourth information processing apparatus of the disclosure, those skilled in the art may refer to the description in the method embodiments for understanding, and no elaboration will be made herein.

Each function unit in each embodiment of the disclosure may be integrated into a processing unit, each unit may also exist independently, and two or more than two units may also be integrated into a unit. The abovementioned integrated unit may be implemented by hardware, or may be implemented by a combination of hardware and software function unit.

Figure 15:
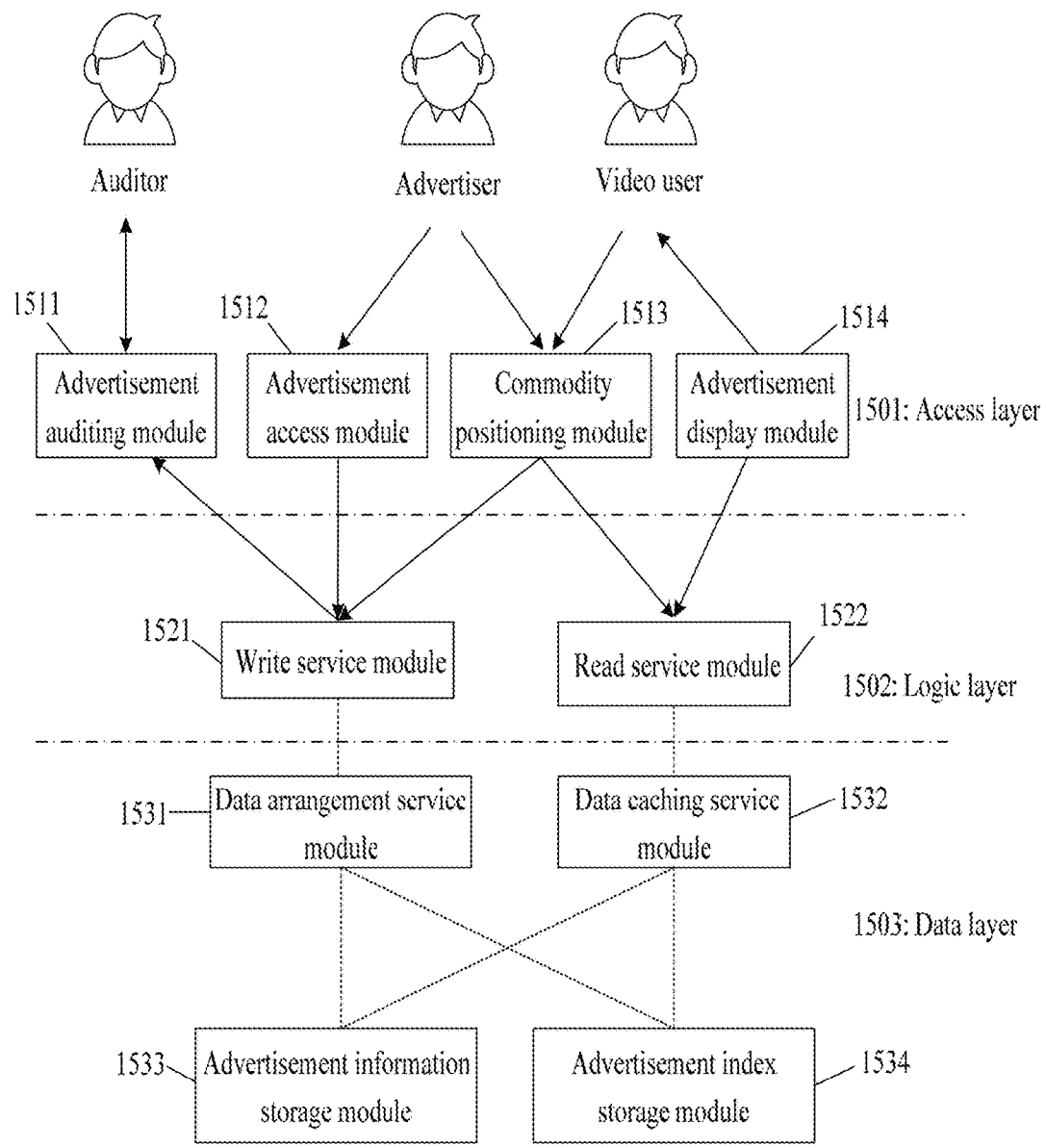
FIG. 15 is an architecture diagram of an advertisement system according to an embodiment of the disclosure.

The first device, the second device, the third device and the fourth device actually implement an advertisement system, and the advertisement system may implement various functions of an advertiser, a video provider, a user and the like. FIG. 15 is an architecture diagram of an advertisement system according to an embodiment of the disclosure. As shown in FIG. 15, the system is divided into an access layer 1501, a logic layer 1502 and a data layer 1503 according to a hierarchical architecture.

The access layer 1501 includes an advertisement access module 1511, an advertisement auditing module 1512, a commodity positioning module 1513 and an advertisement display module 1514.

The advertisement access module 1511 is configured to provide an advertisement access function for the advertiser, and the advertiser submits advertisement information.

The advertisement auditing module 1512 is configured to audit an advertisement requested to be accessed by the advertiser.

The commodity positioning module 1513 is configured to position a commodity appearing in a video, and in the background, a positioning result of the positioning module is converted into a corresponding commodity advertisement index to uniquely indicate a group of advertisements.

The advertisement display module 1514 is configured to display an advertisement of a commodity selected by the video user to the user.

The logic layer 1502 includes a write service module 1521 and a read service module 1522.

The write service module 1521 is configured to arrange and write the advertisement information input by the advertiser into the data layer, and meanwhile, associate an advertisement with a corresponding advertisement index.

The read service module 1522 is configured to display the corresponding advertisement to the user according to selection of the video user.

The data layer 1503 includes a data arrangement service module 1531, a data caching service module 1532, an advertisement information storage module 1533 and an advertisement index storage module 1534.

The data arrangement service module 1531 is configured to arrange and check data to be written into the storage module;

The data caching service module 1532 is configured to cache bottom-layer data to improve system performance.

The advertisement information storage module 1533 is configured to settle and store specific information of an advertisement.

the advertisement index storage module 1534 is configured to store identification information of the advertisement.

Figure 16A:
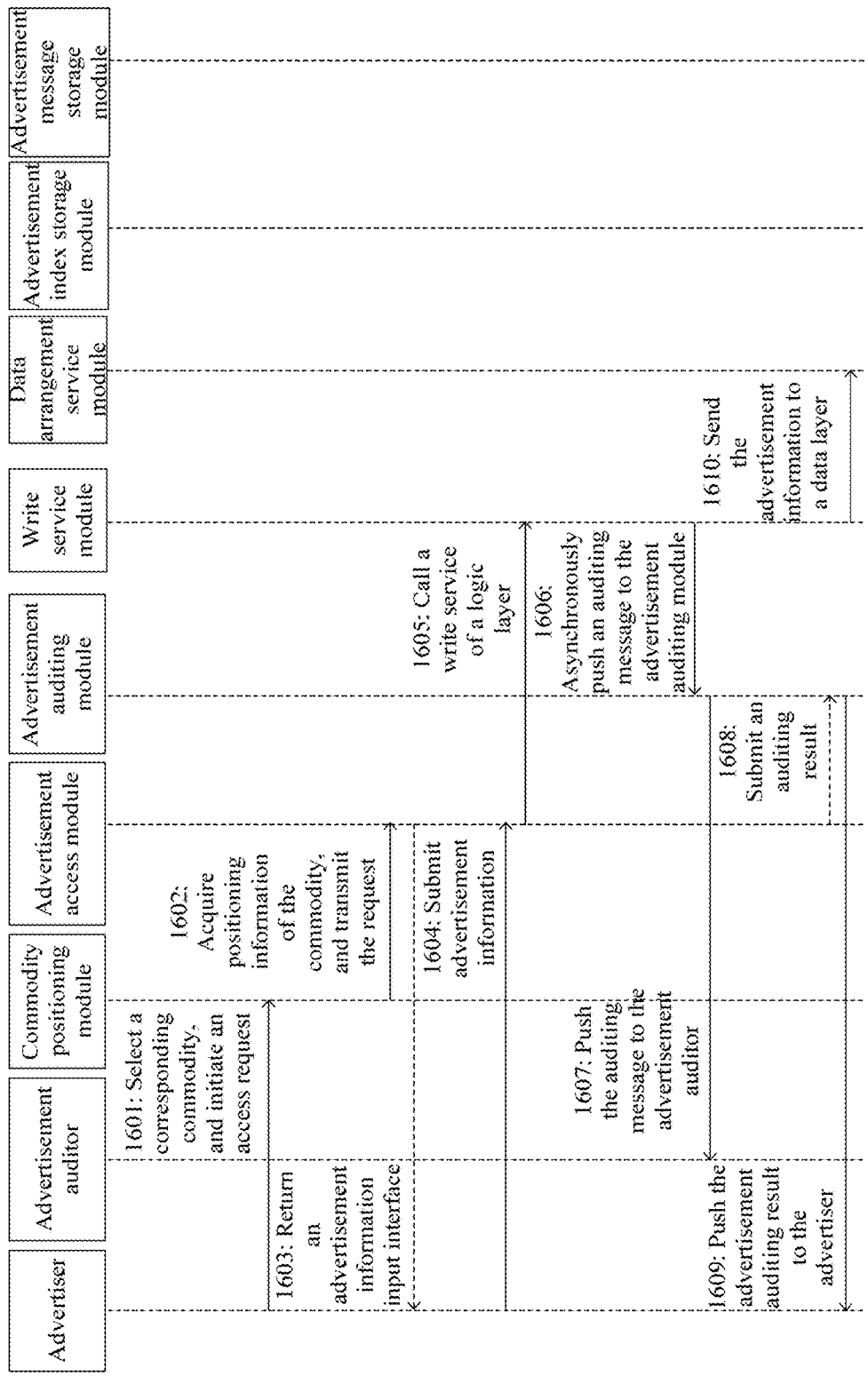
FIG. 16A is a first portion of a flowchart of an information processing method according to an embodiment of the disclosure.
Figure 16B:
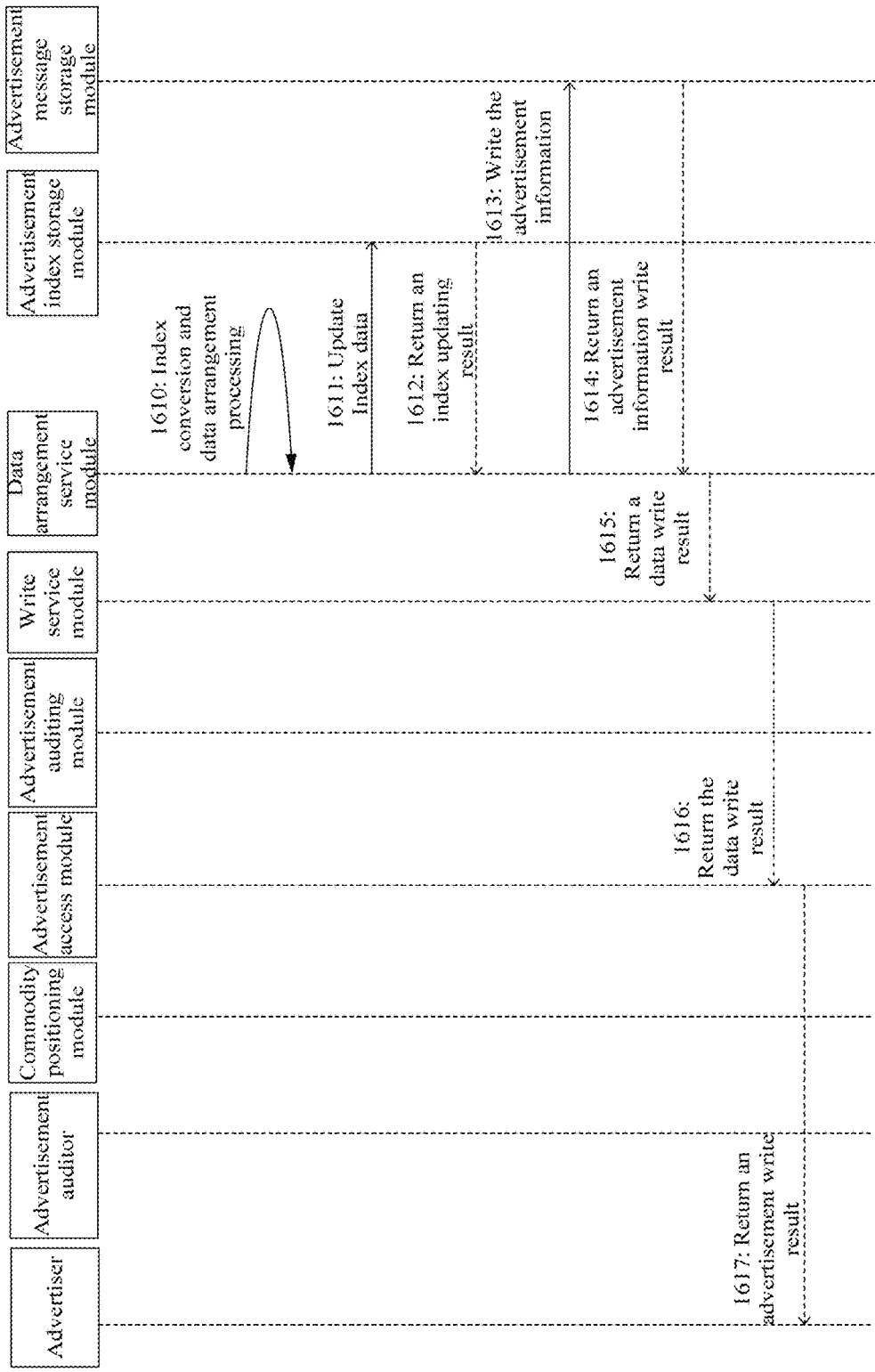
FIG. 16B is a second portion of a flowchart of an information processing method according to an embodiment of the disclosure.

Based on the previous embodiment, an embodiment of the disclosure provides an information processing method. FIGS. 16A and 16B show a flowchart of an information processing method according to the embodiment of the disclosure. As shown in FIGS. 16A and 16B, the method includes the following steps.

In Step 1601, an advertiser positions a commodity appearing in a video by virtue of a commodity positioning module, and initiates an advertisement access request.

In Step 1602, the commodity positioning module acquires position information of the commodity according to an operation of a user, and transmits position information of the commodity and request information of the advertiser to an advertisement access module.

In Step 1603, the advertisement access module returns an advertisement information input interface for the advertiser.

In Step 1604, the advertiser inputs and submits advertisement information.

In Step 1605, after receiving the advertisement information, the advertisement access module transmits the advertisement information to a write service of a logic layer for processing.

In Step 1606, after receiving the advertisement information, the write service module asynchronously pushes an auditing message to an advertisement auditing module to initiate an advertisement auditing flow on one hand, and on the other hand, the write service sends the advertisement information to data arrangement service of a data layer.

In Step 1607, after receiving auditing details, the advertisement auditing module sends an auditing notification to an advertisement auditor.

In Step 1608, the advertisement auditor executes an advertisement auditing operation after receiving the advertisement auditing notification, and submits an auditing result to the advertisement auditing module after the auditing operation is ended.

In Step 1609, the advertisement auditing module synchronizes an advertisement auditing result to the advertiser after receiving the auditing result.

In Step 1610: a data arrangement service module receives the advertisement information sent by the write service module, and executes a data arrangement operation, such as an operation of converting the position information of the commodity into an advertisement index.

In Step 1611, the data arrangement service module writes identification information of the advertised commodity into an advertisement index storage module.

In Step 1612, the advertisement index storage module returns a storage result.

In Step 1613, the data arrangement service module simultaneously stores the advertisement information in an advertisement message storage module.

In Step 1614, the advertisement message storage module returns a storage result.

In Step 1615, the data arrangement service module returns a data write result to the logic layer.

In Step 1616, the write service module returns the data write result to the advertisement access module In Step 1617, the advertisement access module returns an advertisement access result to the advertiser.

Figure 17A:
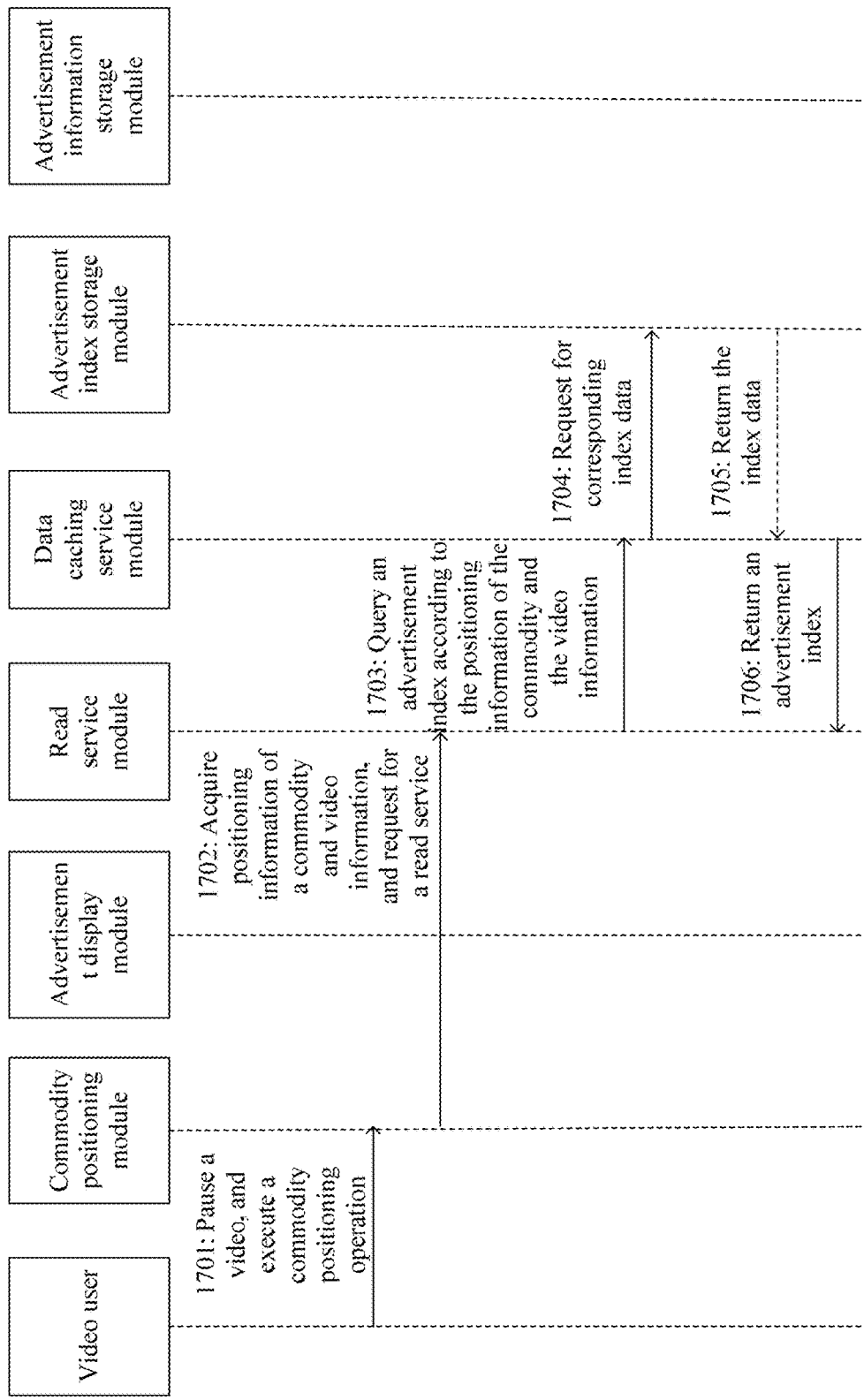
FIG. 17A illustrates a first portion of an implementation flowchart of an information processing method according to an embodiment of the disclosure.
Figure 17B:
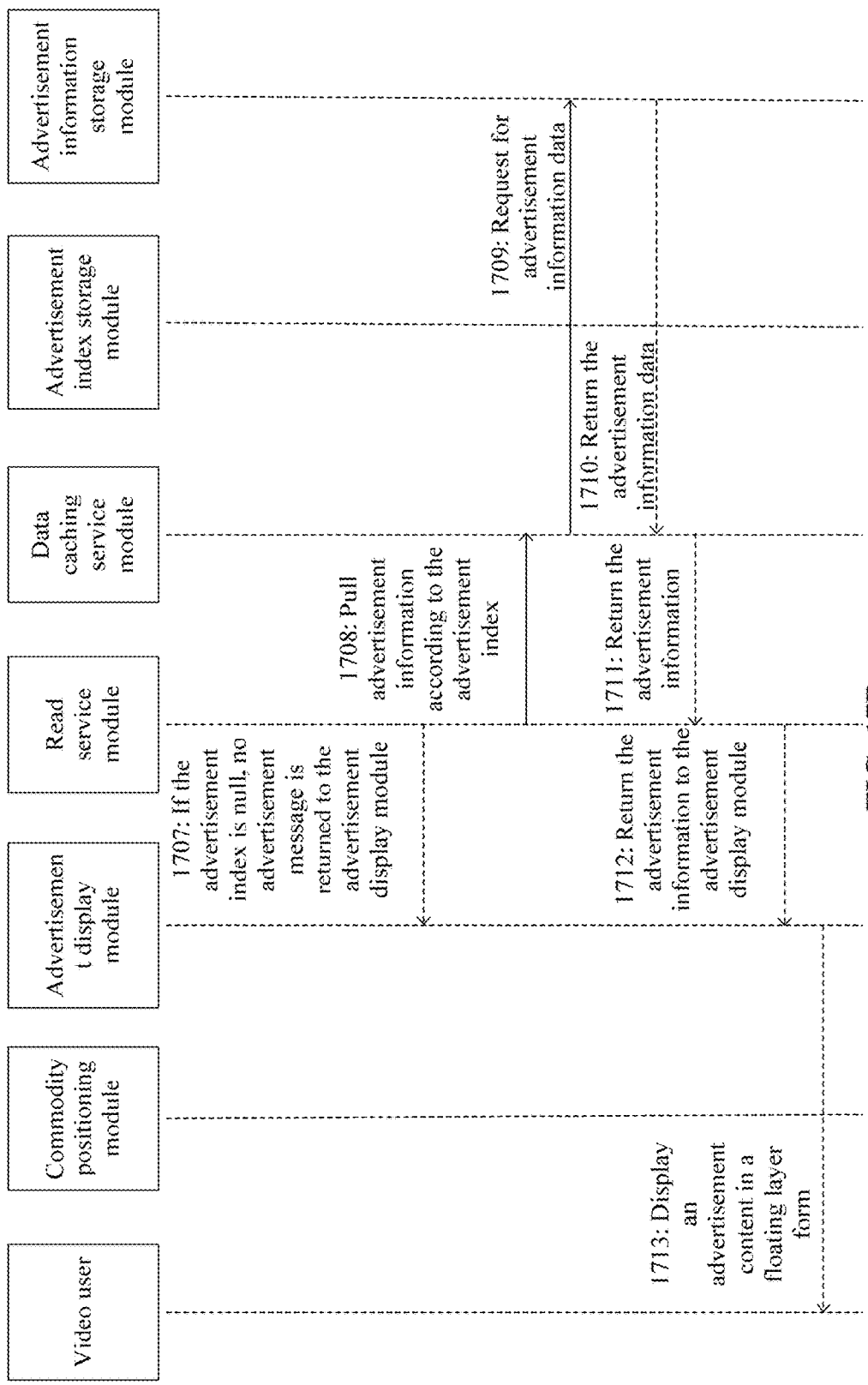
FIG. 17B illustrates a second portion of an implementation flowchart of an information processing method according to an embodiment of the disclosure.

Based on the embodiment described above with reference to FIG. 14, an embodiment of the disclosure provides an information processing method. FIGS. 17A and 17B show an implementation flowchart of an information processing method according to the embodiment of the disclosure. As shown in FIGS. 17A and 17B, the method includes the following steps.

In Step 1701, when seeing an interesting commodity in a video watching process, a video user pauses a video, and executes a commodity positioning operation through a commodity positioning module.

In Step 1702, the commodity positioning module acquires position information of the commodity and video information, and initiates a read request to the read service.

In Step 1703, a read service module queries a data caching service module for a corresponding advertisement index according to the position information of the commodity and the video information.

In Step 1704, the data caching service module queries a caching module for the corresponding advertisement index, and if there is no identification information of a corresponding advertisement in the caching module, the data caching service module requests an advertisement index storage module for data.

In Step 1705, the advertisement index storage module returns a query result to the data caching service module, and if the advertisement index storage module has the corresponding advertisement index data, the data caching service module updates the advertisement index into the caching module.

In Step 1706, the data caching service module returns the advertisement index query result to the read service module.

In Step 1707, if the advertisement index query result returned to the read service by the data caching service module indicates that no advertisement index exists, the read service module returns no advertisement message to an advertisement display module.

In Step 1708, if the advertisement index query result returned to the read service by the data caching service module indicates that the advertisement index exists, the read service module continues to request the data caching service module for advertisement information.

In Step 1709, the data caching service module queries the caching module for the corresponding advertisement information, and if no advertisement information exists in the caching module, requests the advertisement information storage module for data.

In Step 1710, the advertisement information storage module locally queries and returns advertisement data corresponding to the index after receiving a query request.

In Step 1711, the data caching service module updates the advertisement information into the caching module for caching after acquiring the advertisement information data, and returns the advertisement information to the read service.

In Step 1712, the read service module returns the data to the advertisement display module after reading the advertisement information.

In Step 1713, the advertisement display module displays an advertisement content to the video user in a floating layer manner.

The information processing method in the embodiment of the disclosure actually provides a method for displaying an advertisement to a user. In the disclosure, if the advertisement information includes a link address of a mobile terminal, a system may generate and display a two-dimensional code pattern corresponding to the link address in a floating layer. By such a method, the user who is watching a video on a PC or a TV may scan the two-dimensional code to jump to a corresponding site (such as a purchasing interface and advertisement home page of a commodity) by virtue of a mobile device after an advertisement interface appears, and in such a manner, the user does not need to stay for too long in the advertisement interface in the video, so as to avoid interrupting the user watching the video when an advertisement appears for too long.

It is to be noted that in the embodiment of the disclosure, when being implemented in a form of a software function module and sold or used as an independent product, the abovementioned information processing method may also be stored in a non-transitory computer-readable storage medium. Based on such an understanding, the technical solutions of the embodiments of the disclosure substantially or parts making contributions to the conventional art may be embodied in a form of a software product, and the computer software product is stored in a non-transitory computer-readable storage medium, including a plurality of instructions configured to enable a computer (which may be a PC, a server, a network device or the like) to execute all or part of the method in each embodiment of the disclosure. The abovementioned non-transitory computer-readable storage medium includes: various media capable of storing program codes such as a U disk, a mobile hard disk, a Read-Only Memory (ROM), a magnetic disk or an optical disk. Therefore, the embodiments of the disclosure are not limited to any specific hardware and software combination.

Correspondingly, the embodiment of the disclosure further provides a non-transitory computer-readable storage medium, in which computer-executable instructions are stored, for executing an information processing method in a first device, a second device or a fourth device side in the disclosure.

Based on the abovementioned non-transitory computer-readable storage medium, the embodiment of the disclosure further provides a second device, which includes a memory, a processor and a display screen.

The memory is configured to store computer-executable instructions.

The display screen is configured to display a video, the video including a commodity.

The processor is configured to execute the computer-executable instructions stored in the memory, the computer-executable instructions including: acquiring identification information of the commodity in the video, acquiring, according to the identification information of the commodity, corresponding advertisement information, containing the advertisement information in a first read response and sending the first read response to a fourth device.

Based on the abovementioned non-transitory computer-readable storage medium, the embodiment of the disclosure further provides a first device, which includes a memory, a processor and a display screen.

The memory is configured to store computer-executable instructions.

The display screen is configured to display a video, the video including a commodity.

The processor is configured to execute the computer-executable instructions stored in the memory, the computer-executable instructions including: playing a video, acquiring a first input operation for selecting a commodity in a current played frame of the video, acquiring identification information of the commodity corresponding to the first input operation from the current frame of the video, acquiring a second input operation for inputting advertisement information of the commodity, acquiring the advertisement information of the commodity according to the second input operation, sending a second advertisement access request to a second device, the second advertisement access request containing the identification information and advertisement information of the commodity, and receiving a second advertisement access response sent by the second device, wherein the second advertisement access response contains an auditing result and indicates whether the advertisement information passes an audit.

Based on the abovementioned non-transitory computer-readable storage medium, the embodiment of the disclosure further provides a fourth device, which includes a memory, a processor and a display screen.

The memory is configured to store computer-executable instructions.

The display screen is configured to display a video, the video including a commodity.

The processor is configured to execute the computer-executable instructions stored in the memory, the computer-executable instruction including: playing a video, acquiring a first input operation for selecting a commodity in a current played frame of the video, acquiring identification information of the commodity corresponding to the first input operation from the current frame of the video, acquiring, according to the identification information of the commodity, corresponding advertisement information, and displaying the advertisement information on the display screen of the fourth device.

It is to be noted that first, second, third, fourth and the like in the embodiments of the disclosure, such as description of a first information processing apparatus, a second device and a third information processing apparatus, is not intended to represent any sequential relationship but for convenient description and clear citation.

It is to be understood that "one embodiment" or "an embodiment" mentioned in the whole specification means that a specific characteristic, structure or property related to the embodiment is included in at least one embodiment of the disclosure. Therefore, "in one embodiment" or "in an embodiment" appearing in each part of the whole specification does not necessarily refer to the same embodiment. In addition, these specific characteristics, structures or properties may be combined in one or more embodiments in any proper manner. It should be understood that a magnitude of a sequence number of each process in each embodiment of the disclosure is not intended to specify an execution sequence, an execution sequence of each process should be determined according to its function and internal logic, and no limits to implementation processes of the embodiments of the disclosure should be formed. Sequence numbers of the embodiments of the disclosure are just intended for convenient description, and do not represent quality of the embodiments.

It is to be noted that terms "include", "contain" or any other variation in the disclosure is intended to cover non-exclusive inclusions, so that a process, method, object or apparatus including a series of elements not only includes those elements, but also includes other elements which are not clearly listed, or further includes elements intrinsic to the process, the method, the object or the apparatus. Under the condition of no more limits, an element limited by a sentence "include one" does not exclude the condition that an additional element which is the same still exists in a process, method, object or apparatus including the element.

In some embodiments provided by the disclosure, it is to be understood that the disclosed device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling, or direct coupling or communication connection between each displayed or discussed component may be indirect coupling or communication connection, implemented through some interfaces, of the device or the units, and may be electrical and mechanical or adopt other forms.

The abovementioned units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

Those skilled in the art should know that, all or part of the steps of the abovementioned method embodiment may be implemented by instructing related hardware through a program, the abovementioned program may be stored in a computer-readable storage medium, and the program is executed to execute the steps of the abovementioned method embodiment; and the storage medium includes: various media capable of storing program codes such as a mobile storage, a ROM, a magnetic disk or an optical disk.

Or, when being implemented in form of software function module and sold or used as an independent product, the integrated unit of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer (which may be a PC, a server, network device or the like) to execute all or part of the method in each embodiment of the disclosure. The above-mentioned storage medium includes: various media capable of storing program codes such as mobile storage, a ROM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

In the embodiments of the disclosure, the second device acquires the identification information of the commodity in the video; the second device acquires the advertisement information according to the identification information of the corresponding commodity; and the second device contains the advertisement information in the first read response, and sends the first read response to the fourth device. In such a manner, a video user may be directly turned into a consumer of the commodity, thereby increasing earnings of the video.

The invention claimed is:

1. An information processing method, applied in a second device, comprising:
  receiving, by the second device from a fourth device, a first read request containing video information of a video played at the fourth device, a frame number of a current frame, and position information of a user input operation comprising a user interaction with the video to receive information about a commodity in the video;
  querying, by the second device, a two-dimensional list corresponding to the current frame for an identification of the commodity according to the position information of the user input operation, wherein the two-dimensional index for the current frame includes at least two different commodities at different locations within the frame;
  acquiring, by the second device, identification information of the commodity in the video corresponding to the user interaction with the video based on the query of the two-dimensional list;
  acquiring, by the second device, according to the identification information of the commodity, corresponding advertisement information comprising commodity information and attribute information, wherein the commodity information and the attribute information are used to display the commodity and provide purchase information to the user;
  sending, by the second device, the first read response comprising the advertisement information to the fourth device, so that the fourth device can display the advertisement information on a display screen of the fourth device; and
  receiving, by the second device, a second advertisement access request from a first device, the second advertisement access request containing the identification information of the commodity and the advertisement information of the commodity.

2. The method according to claim 1, wherein the acquiring, by the second device, according to the identification information of the commodity, corresponding advertisement information comprising commodity information and attribute information comprises:
  querying, by the second device, a second preset index list to obtain a query result according to the identification information of the commodity, wherein the query result indicates whether there is the advertisement information corresponding to the identification information of the commodity in an index database;
  when the query result indicates that there is the advertisement information corresponding to the identification information of the commodity in the index database, obtaining, by the second device, identification information of the advertisement information corresponding to the identification information of the commodity from the second index list; and
  acquiring, by the second device, the advertisement information from the index database according to the identification information of the advertisement information.

3. The method according to claim 2, further comprising:
  when the query result indicates that there is no advertisement information corresponding to the identification information of the commodity in the index database, containing, by the second device, the query result in the first read response, and sending the first read response to the fourth device.

4. The method according to claim 2, wherein after the operation of receiving, by the second device, a second advertisement access request from a first device, the second advertisement access request containing the identification information of the commodity and the advertisement information of the commodity, further comprising:
  establishing, by the second device, the second index list associated with the video, wherein the second index list indicates a mapping relationship between identification information of a commodity appearing in the video and identification information of advertisement information of the commodity; and
  storing, by the second device, the second index list.

5. The method according to claim 4, wherein the method further comprises:
  acquiring, by the second device, a second input operation for inputting the advertisement information of the commodity.

6. The method according to claim 4, wherein the method further comprises:
  acquiring, by the second device, the advertisement information of the commodity from an advertisement database according to the identification information of the commodity.

7. The method according to claim 1, further comprising:
  auditing, by the second device, the advertisement information in the second advertisement access request to obtain an auditing result, in response to the second advertisement access request;
  or,
  sending, by the second device, a first prompt for prompting an auditor of auditing the advertisement information, in response to the second advertisement access request, and acquiring, by the second device, the auditing result according to an operation of the auditor;
  or,
  sending, by the second device, an auditing request to a third device, in response to the second advertisement access request for requesting the auditor to audit the advertisement information, and receiving, by the second device, the auditing result from the third device.

8. The method according to claim 1, wherein the attribute information comprises introductions, selling price, purchasing link and purchasing address of the commodity; and
wherein the method further device comprises the fourth device displaying the advertisement information in a floating layer manner so that the advertisement information and the video are displayed together.

9. The method according to claim 1, further comprising:
acquiring, by the second device, an auditing result of the advertisement information in the second advertisement access request, wherein the auditing result indicates whether contents indicated by the advertisement information pass an audit; and
when the contents indicated by the advertisement information pass the audit, advertisement access is allowed; when the contents indicated by the advertisement information do not pass the audit, advertisement access is not allowed.

10. The method according to claim 9, further comprising:
containing, by the second device, the auditing result in a second advertisement access response; and
sending, by the second device, the second advertisement access response to the first device.

11. An information processing method, applied in a fourth device, the method comprising:
playing, by the fourth device, a video;
acquiring, by the fourth device, a first input operation for selecting a commodity in a current frame of the video;
determining, by the fourth device, position information of the first input operation;
querying, by the fourth device, a two-dimensional list corresponding to the current frame for an identification of the commodity according to the position information of the first input operation, wherein the two-dimensional index for the current frame includes at least two different commodities at different locations within the frame;
acquiring, by the fourth device, identification information of the commodity corresponding to the first input operation from the current played frame of the video based on the query of the two-dimensional list;
acquiring, by the fourth device, according to the identification information of the commodity, corresponding advertisement information, wherein the advertisement information comprises commodity information and attribute information; wherein the commodity information and the attribute information are used to display the commodity and provide purchase information to the user, wherein contents indicated by the advertisement information have been audited and an auditing result of the advertisement information indicates that the contents indicated by the advertisement information pass the audit; and
displaying, by the fourth device, the advertisement information on a display screen of the fourth device.

12. The method according to claim 11, wherein the acquiring, by the fourth device, according to the identification information of the commodity, corresponding advertisement information comprises:
containing, by the fourth device, the identification information of the commodity in a first read request, and sending the first read request to a second device, the first read request being used to request for the advertisement information of the commodity corresponding to the identification information of the commodity; and
receiving, by the fourth device, a first read response containing the advertisement information.

13. The method according to claim 11, wherein the attribute information comprises introductions, selling price, purchasing link and purchasing address of the commodity; and
wherein displaying, by the fourth device, the advertisement information on a display screen of the fourth device comprises:
displaying, by the fourth device, the advertisement information in a floating layer manner so that the advertisement information and the video are displayed together.

14. A second device, comprising:
a memory, configured to store computer-executable instructions;
and
a processor, configured to execute the computer-executable instructions stored in the memory, the computer-executable instructions comprising:
receiving, from a fourth device, a first read request containing video information of a video played at the fourth device, a frame number of a current frame, and position information of a user input operation comprising a user interaction with the video to receive information about a commodity in the video;
querying a two-dimensional list corresponding to the current frame for an identification of the commodity according to the position information of the user input operation, wherein the two-dimensional index for the current frame includes at least two different commodities at different locations within the frame;
acquiring identification information of the commodity in the video corresponding to the user interaction with the video based on the query of the two-dimensional list;
acquiring, according to the identification information of the commodity, corresponding advertisement information comprising commodity information and attribute information, wherein the commodity information and the attribute information are used to display the commodity and provide purchase information to the user;
containing the advertisement information in a first read response;
sending the first read response comprising the advertisement information to the fourth device, such that the fourth device is capable of displaying the advertisement information on a display screen of the fourth device;
receiving a second advertisement access request from a first device, the second advertisement access request containing the identification information of the commodity and the advertisement information of the commodity.

15. The second device according to claim 14, wherein the acquiring, according to the identification information of the commodity, corresponding advertisement information comprising commodity information and attribute information comprises:
querying a second preset index list to obtain a query result according to the identification information of the commodity, wherein the query result indicates whether there is the advertisement information corresponding to the identification information of the commodity in an index database;
when the query result indicates that there is the advertisement information corresponding to the identification information of the commodity in the index database, obtaining identification information of the advertisement information corresponding to the identification information of the commodity from the second index list; and acquiring the advertisement information from the index database according to the identification information of the advertisement information.

16. The second device according to claim 15, wherein the computer-executable instructions further comprise:

when the query result indicates that there is no advertisement information corresponding to the identification information of the commodity in the index database, containing the query result in the first read response, and sending the first read response to the fourth device.

17. The second device according to claim 15, wherein after the operation of receiving, by the second device, a second advertisement access request from a first device, the second advertisement access request containing the identification information of the commodity and the advertisement information of the commodity, the computer-executable instructions further comprise:

establishing the second index list associated with the video, wherein the second index list indicates a mapping relationship between identification information of a commodity appearing in the video and identification information of advertisement information of the commodity; and storing the second index list.

18. The second device according to claim 17, wherein the computer-executable instructions further comprise:

acquiring a second input operation for inputting the advertisement information of the commodity.

19. The second device according to claim 17, wherein the computer-executable instructions further comprise:

acquiring the advertisement information of the commodity from an advertisement database according to the identification information of the commodity.

20. The second device according to claim 14, wherein the computer-executable instructions further comprise:

acquiring an auditing result of the advertisement information in the second advertisement access request, wherein the auditing result indicates whether contents indicated by the advertisement information pass an audit; and when the contents of the advertisement information pass the audit, advertisement access is allowed; when the contents of the advertisement information do not pass the audit, advertisement access is not allowed.

* * * * *